(12) United States Patent
Hoover

(10) Patent No.: US 10,783,876 B1
(45) Date of Patent: Sep. 22, 2020

(54) SPEECH PROCESSING USING CONTEXTUAL DATA

(71) Applicant: Amazon Technologies, Inc., Seattle, WA (US)

(72) Inventor: Thomas Jay Hoover, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 175 days.

(21) Appl. No.: 16/141,573

(22) Filed: Sep. 25, 2018

(51) Int. Cl.
  *G10L 15/18* (2013.01)
  *G10L 15/30* (2013.01)
  *G10L 15/22* (2006.01)
  *G06F 40/295* (2020.01)

(52) U.S. Cl.
  CPC ........ *G10L 15/1815* (2013.01); *G06F 40/295* (2020.01); *G10L 15/22* (2013.01); *G10L 15/30* (2013.01); *G10L 2015/223* (2013.01)

(58) Field of Classification Search
  CPC .. G06F 16/9535; G06F 16/252; G06F 16/245; G06F 16/242; G06F 16/24534; G06F 16/9537; G06F 11/3476; G06F 16/2264; G06F 16/2453; G06F 16/2455; G06F 16/24575; G06F 16/258; G06F 16/58; G06F 16/9024; G06F 21/6218; G06F 21/6227; G06F 21/6254; G06F 2201/80; G06F 11/1435; G06F 11/1471; G10L 15/22; G10L 2015/223; G10L 15/18; G10L 15/26; G10L 25/54; G10L 2015/088; G10L 13/02; G10L 15/08; G10L 15/1822; G10L 15/183; G10L 17/26; G10L 2025/783; G10L 25/87; G10L 13/033; G10L 15/02; G10L 15/04; G10L 15/063; G10L 15/16; G10L 15/1815; G10L 15/19
  See application file for complete search history.

(56) References Cited

U.S. PATENT DOCUMENTS

2019/0197194 A1* 6/2019 Larusson .............. G06F 16/248
2019/0340283 A1* 11/2019 Schneider ......... G06F 16/24542

OTHER PUBLICATIONS

Araby; How to Add Contextual Help to Your Alexa Skill; Alexa Blogs; May 14, 2018; Retrieved from https://developer.amazon.com/blogs/alexa/post/b0b1cfc0-0792-4e98; 6 pgs.

(Continued)

*Primary Examiner* — Huyen X Vo
(74) *Attorney, Agent, or Firm* — K&L Gates LLP

(57) ABSTRACT

Devices and techniques are generally described for shared execution caching of contextual data. A first request to retrieve a first value from a first field of a database may be received. First entity identifier data associated with the first request may be determined. A second request to retrieve the first value from the first field may be received, the second request being associated with second entity identifier data. A determination may be made that a first host device is associated with the first entity identifier data and the second entity identifier data. In some examples, a first executable instruction effective to retrieve the first value from the first field of the database when executed by the first host device may be generated. In some examples, the first value may be retrieved from the first field of the database and sent to the first speech processing component.

20 Claims, 7 Drawing Sheets

(56) References Cited

OTHER PUBLICATIONS

Raju et al.; Contextual Language Model Adaptation for Conversational Agents; Cornell University Library; Jul. 6, 2018; 5 pgs.
Raju; Contextual Clues Can Help Improve Alexa's Speech Recognizers; Alexa Blogs; Jul. 23, 2018; Retrieve from https://developer.amazon.com/blogs/alexa/post/ab5bd7dd-ffa4-4607; 5 pgs.

* cited by examiner

SPEECH PROCESSING USING CONTEXTUAL DATA

BACKGROUND

Automatic speech recognition (ASR) combined with language processing techniques may enable a computing device to retrieve and process commands based on a user's spoken commands. In some systems, speech recognition and/or voice-controlled devices activate upon detection of a spoken "wake-word" or "wake command." Natural language processing is used to translate the spoken commands into computer-executable instructions. The executable instructions are executed and a corresponding task is performed. Such speech recognition and voice control may be used by personal computers, hand-held devices, telephone computer systems, and a wide variety of other computing devices to improve human-computer interactions.

DETAILED DESCRIPTION

Figure 1:
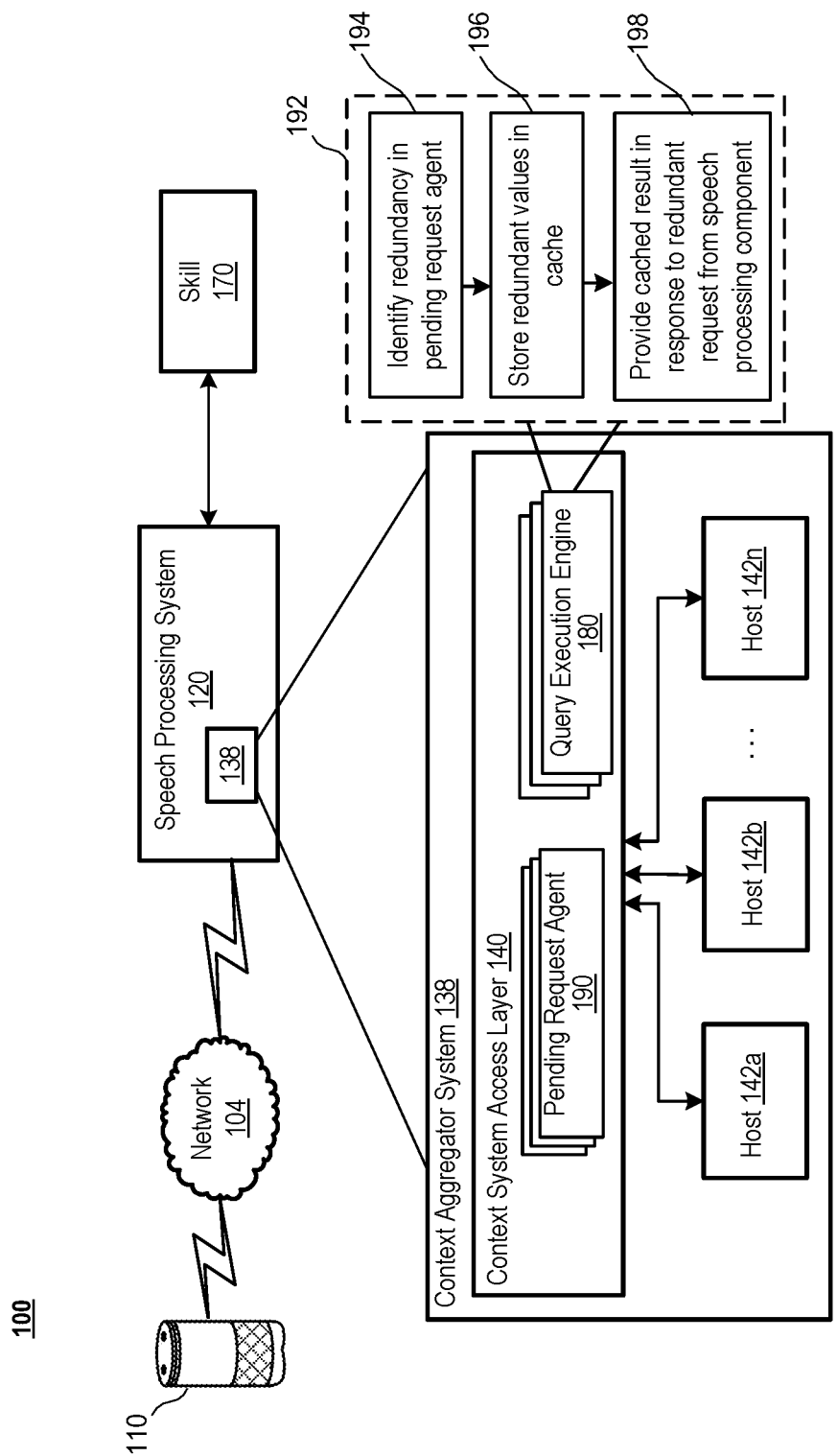
FIG. 1 is a conceptual illustration of a system including a shared execution caching architecture for contextual data, in accordance with various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, rather than specific commands or instructions. Text-to-speech (TTS) is a field of computer science, artificial intelligence, and linguistics concerned with enabling computers to output synthesized speech. ASR, NLU, and TTS may be used together as part of a speech processing system.

A speech-controlled computing system may answer user commands requesting the output of content. In various examples, in order to interpret a request, the NLU component of a speech processing system may have access to contextual information. Contextual information or data (e.g., contextual speech-processing data) may be factual information contextualized to a particular entity. An entity may be a particular device ID, a particular IP address, an account ID, a request ID, etc. For example, a user may speak the request, "Computer, what is the score of the football game?" The speech processing system may have access to contextual information related to the device ID. For example, the speech processing system may access contextual data indicating that the device ID is registered to an address in Seattle, Wash. In the example, the speech processing system may use this contextual information to determine that the user is requesting the score of the local Seattle football team. By contrast, global information may be information that is the same regardless of any particular entity. For example, the speed of light in vacuum is 299,792,458 meters per second. The speed of light in vacuum is an example of global information. By contrast, a particular person's favorite song is contextual information related to that particular person.

Various different partition keys may be used to define an entity for the shared execution caching architecture described herein. For example, for the user request "Computer, what is the weather?", the NLU component may have access to a device identifier (e.g., an identifier of a speech-processing device with one or more microphones receiving the spoken user request). In this example, the device identifier may be the partition key by which an entity is distinguished from among other entities (e.g., one device ID is distinguishable from among other, different device IDs). The device identifier may be associated with a registered location of the device. For example, the device ID of the device receiving the spoken request "Computer, what is the weather?" may be registered to an address located in Seattle, Wash. Accordingly, the NLU component may receive the contextual data (e.g., that the device corresponding to the device ID receiving the spoken request is located in Seattle, Wash.) along with text representing the spoken request. Accordingly, the contextual data may be used to form an inference that the user would like to know the weather in Seattle, Wash.

Additionally, the user (or a different user) may request "Computer, give me a traffic report." In accordance with various embodiments described herein, the device ID of the traffic report request may match the device ID of the previous weather request. Accordingly, both the traffic request and weather request may be routed to the same contextual data host system (or device). Routing contextual data requests with the same partition key to the same contextual data host system allows the data host system to analyze pending requests for redundancy. When redundancy is detected, the contextual data host system may generate an executable process to retrieve the requested data for one request and may cache the requested data. Thereafter, the contextual data host system may provide the cached data in response to redundant requests without having to generate additional executable processes to retrieve redundant data.

Returning to the previous example, since the weather request and traffic request are both related to the same device ID (e.g., the partition key defining the entity in the current example), the two requests for contextual data (e.g., the requests for a location associated with the device ID) may be sent by an orchestrator of the speech processing system to the same contextual data host system. Thereafter, the contextual data host system may determine that two requests are pending for the same field of a database (e.g., the field that stores the location associated with the device ID). Accordingly, the contextual data host may generate an executable instruction to retrieve the data in response to one of the two requests. The contextual data host may thereafter store the retrieved result in a cache and may provide the cached result in response to the remaining, pending request without having to generate a second executable instruction to re-retrieve the data from the underlying database. The results may be returned to the speech processing components that requested the location associated with the device ID (e.g., the requested contextual data).

Other examples of partition keys used to define entities (apart from device identifiers) may include request identifier data (e.g., data that identifies a request from among other requests), an account identifier (e.g., data that identifies an account from among other accounts), a user identifier, etc. Contextual data may be used in other ways apart from inference making and/or natural language processing. For example, skills (e.g., speech processing skills) may use contextual information to train machine learning models to make predictions relevant to the skill. Additionally, a list of appropriate skills and/or intents (e.g., semantic understandings of user utterances) may be ranked based at least in part on contextual data.

Storage and/or use of contextual data related to a particular person or device may be controlled by a user using privacy controls associated with a speech-controlled device and/or a companion application associated with a speech-controlled device. Accordingly, users may opt out of storage of contextual data and/or may select particular types of contextual data that may be stored while preventing aggregation and storage of other types of contextual data. Additionally, aggregation, storage, and use of contextual information, as described herein, may be compliant with privacy controls, even if not technically subject to them, to bolster user trust. For example, contextual and other data described herein may be treated as if it fell under acts and regulations, such as the Health Insurance Portability and Accountability Act (HIPAA) and the General Data Protection Regulation (GDPR), even if it does not actually fall under these acts and regulations.

The system may be configured with multiple applications (e.g., thousands, tens of thousands, or more applications) that can be used to respond to user commands. Applications, domains (a term associated with natural language processing), speechlets, actions (with respect to Google Assistant), and other similar terms are referred to herein as "skills". For example, the system may include weather skills, music skills, video skills, calendar skills, timer skills, general knowledge answering skills, game skills, etc. Further, the system may be capable of operating many different skills that have an overlapping subject matter. For example, the system may include more than one skill that can execute commands related to requests for weather information. For further example, the system may include one or more medical information skills that execute commands requesting medical information. Determining which skill or skills may be applicable to handle an incoming user command is a non-trivial determination. Contextual data may be used to determine the appropriate skill or skills to invoke based on a particular user utterance.

The invocation of a skill by a user's utterance may include a request that an action be taken. That request can be transmitted to a control system that will cause that action to be executed. For example, the user's utterance may be, "Computer, turn on the living room lights." In response, instructions may be sent to a "smart home" system to turn on the lights in the user's living room. Examples of skills include voice-enabled applications invoked by the Siri virtual personal assistant from Apple Inc. of Cupertino, Calif., voice-enabled actions invoked by the Google Assistant virtual personal assistant from Google LLC of Mountain View, Calif., or voice-enabled skills invoked by the Alexa virtual personal assistant from Amazon.com, Inc. of Seattle, Wash.

In various examples, statistical NLU may be used to reduce the cognitive burden on the user. In an NLU-based approach, user utterances are typically classified into one or more intents (e.g., intent data) and/or to one or more supported skills (or into an unsupported skill) followed by further skill-dependent intent and slot analyses (e.g., intent classification and entity extraction). In various examples, statistical NLU may be used to determine a list of intents, domains, skills, etc., that the user may have intended to invoke. The list of intents, domains, skills, etc. may be selected based at least in part on contextual data provided to the NLU. In some examples, the list of intents and/or domains (and/or other NLU results) may be ranked using a ranker component. Intents may be passed to an appropriate skill to perform an action in response to the request. In the example above where the user asks "Computer, what is the weather?" The intent may be a get_weather intent. The get_weather intent may be passed to a weather skill configured to provide audio of the current day's weather forecast. In various examples, contextual data may be used by the NLU to determine the intent based upon input textual data and/or by the skill to determine the appropriate action to take in response to the intent. For example, the location registered in association with the device ID (e.g., Seattle, Wash.) may be provided by the NLU such that the intent generated by the NLU is a get_weather intent for the location "Seattle". The location registered in association with the device ID is an example of first contextual data. Similarly, the weather skill may determine, based on a previous request issued by the device ID or by an IP address associated with the device ID, that the user typically desires the forecast for the subsequent calendar day, based on previous interactions (e.g., previous turns of dialog) with the same device ID. The knowledge that weather requests issuing from the device ID typically request the forecast for the subsequent calendar day may be an example of second contextual data used by the weather skill to provide the best possible output for the user.

In addition to various speech processing components using contextual data, various speech processing components may generate contextual data. For example, a user may utter a spoken request that a particular song be added to a playlist. A music skill may add the song to the playlist. In various examples, an identifier for the song added to the playlist (e.g., a song name and/or album name) may represent contextual data for the device ID, account ID, request ID, IP address, or other entity.

Figure 2:
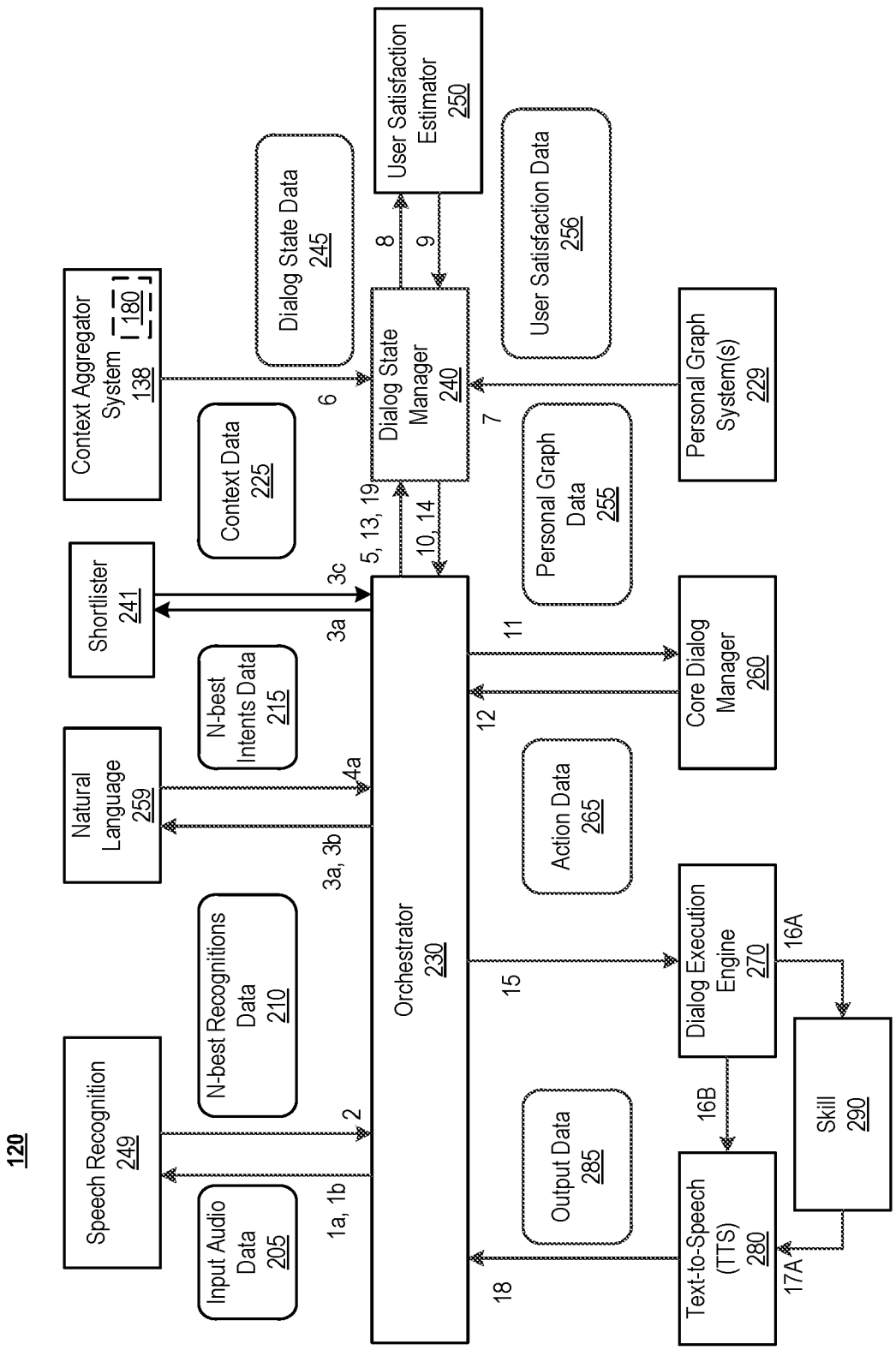
FIG. 2 is a conceptual diagram of components of a speech-processing device(s) according to various embodiments of the present disclosure.

In various examples described herein, contextual data may be stored at a variety of network-accessible locations for retrieval by skills, applications, NLU components, ranker components, and/or other components of the speech-processing architectures described herein (e.g., the speech-processing architecture discussed in reference to FIG. 2). A context system access layer may provide a single access point to contextual data stored by a plurality of contextual data system hosts (sometimes referred to herein as "hosts" or "host devices"). The plurality of context data system hosts (e.g., hosts) together with the context system access layer may be referred to herein as a "context aggregator system". Dedicated hosts and/or dedicated storage within hosts or accessible by hosts may be provided for various types of contextual data. In various examples, a context system access layer may include one or more pending request agents that may comprise lists of pending requests partitioned based on the relevant partition key for a particular entity. Pending request agents may be specific to a single contextual host system or group of contextual host systems. For example, a pending request agent may comprise a list of all pending requests for a particular request ID, device ID, or some other entity, that are directed to a particular contextual data host. Examples of pending requests may include queries (e.g., GraphQL queries) used to retrieve contextual data from one or more of the underlying contextual data systems and/or requests to modify database entries associated with the relevant entity. The context aggregator system may further comprise one or more query execution engines. Query execution engines may be effective to create and execute processes (e.g., queries and/or other operations) based on requests received from various speech processing components (e.g., a natural language components, a skill, etc.). In various examples, query execution engines may be specific to a contextual data host or group of contextual data hosts. The processes created by the query execution engines may be executed to retrieve and/or modify data from the underlying contextual data systems. In various examples described herein, a query execution engine may parse lists of requests associated with a pending request agent for a particular entity to determine whether or not any redundant or partially redundant operations are present. If redundant operations are present, the query execution engine may execute a single process (e.g., a single executable instruction) to retrieve the requested data and may cache the data for the other redundant processes. In this way, the context aggregator system can avoid generating multiple executable processes to retrieve the same data. Such an architecture may reduce computational load and latency. Requests with redundant operations may be referred to as "redundant requests". Additionally, requests with a first number of redundant operations and a second number of non-redundant operations may be referred to as "partially-redundant requests", while requests with the same set of operations may be referred to as "redundant requests".

For example, a pending request agent may comprise a list of currently-pending requests for a particular request ID "1234". The list may include a first request to query fields A, B, C, and D. The list may include a second request to query fields B, C, and E. A query execution engine may parse the list of currently-pending requests for request ID 1234 and may determine that the first request and second request are partially redundant insofar as both the first request and second request are requesting the retrieval of values stored in fields B and C. Accordingly, in an example, the query execution engine 180 may generate an executable instruction to process the first request (e.g., an executable operation to query fields A, B, C, and D). After completion of the first request, the query execution engine 180 may store the values of B and C in a cache. As the values of fields B and C have already been returned and cached based on the first request, the values of fields B and C may be provided in response to the second request instead of generating a new executable instruction to retrieve the values from fields B and C.

Further, a particular partition key may be used to direct all queries related to the same entity to the same host and/or set of hosts. As such, pending request agent lists for a particular entity may be associated with a particular context system host. Query execution engines may direct all executable processes to the relevant host based on the partition key (e.g., based on the entity to which the process is directed). Since all processes related to a particular entity are processed on the same host, redundancy in the processes can be exploited by caching execution results and delaying processes directed to returning redundant results until such results have been cached by an earlier-completed process.

In some examples, query execution engines may comprise prefetching logic programmed to determine particular database fields to prefetch based on current and/or previous processes (e.g., queries). Probability thresholds may be used to determine whether or not to prefetch a particular field. For example, a query execution engine may determine from historical data that a query directed to return the value of field A is followed by a query to return the value of field B, within a predetermined amount of time (e.g., 5 milliseconds, 1 second, 2 seconds, or any suitable amount of time) in 91% of the previous 1,000 cases. In the example, the query execution engine may prefetch any field that has a probability of greater than or equal to 85% of being queried/requested given that a previous field has been queried/requested. Such a probability threshold may be referred to as a prefetch probability threshold. Accordingly, in the example, the query execution engine may prefetch field B prior to receiving a query request to fetch field B.

FIG. 1 illustrates a system 100 including an architecture for shared execution caching of contextual data for speech processing, in accordance with various embodiments of the present disclosure. As shown in FIG. 1, the system 100 includes a computing device 110, a speech processing system 120, a skill 170, and a context aggregator system 138. In various examples, computing device 110 may be configured in communication with the speech processing system 120 over a network 104. Speech processing system 120 may include one or more speech processing devices and/or components, as described in further detail below in reference to FIG. 2. As described in further detail below, network 104 may be, for example, a wide area network, such as the Internet. Speech processing system 120 (which may include one or more different physical devices) may be capable of performing speech processing (e.g., ASR and NLU) as well as non-speech processing operations as described herein. A single computing device may perform all speech processing or multiple computing devices may combine to perform all speech processing. In various examples, context aggregator system 138 may be a component of speech processing system 120, as shown in FIG. 1. However, in other examples, context aggregator system 138 may be a separate system comprising one or more computing devices configured in communication with one or more components of speech processing system 120.

Context aggregator system 138 may be a system through which speech processing system 120, generally, and/or skill 170 may store, retrieve, and/or modify contextual data. Context aggregator system 138 may have a context system access layer 140 which may provide access to underlying hosts of context systems (e.g., hosts 142*a*, 142*b*, ..., 142*n*). Each host 142*a*, 142*b*, ..., 142*n* may represent one or more context systems (e.g., computing devices including storage for storing contextual data). Hosts 142*a*, 142*b*, ... 142*n* may comprise non-transitory, computer-readable storage comprising one or more databases for storing contextual data. Additionally, each of hosts 142*a*, 142*b*, ..., 142*n* may comprise one or more processing elements. Pending request agents 190 may be a list of pending requests partitioned based on a partition key. For example, a particular pending request agent 190 may store a list of all currently-pending requests with a particular request ID "1234". In another example, a particular pending request agent 190 may store all currently-pending requests for a device ID "X73126-J". Although depicted as part of context system access layer 140, pending request agents 190 may be local to hosts 142a, 142b, . . . , 142n. In at least some examples, one or more pending request agents 190 may be associated with a particular host among hosts 142a, 142b, . . . , 142n.

Query execution engines 180 may be effective to generate executable processes (e.g., executable instructions effective to carry out requests) based on the lists of pending requests stored by pending request agent(s) 190. For example, query execution engine 180 may generate an executable process (e.g., a GraphQL query) used to return the value of a field of a database stored by host 142a or by a database to which host 142a has access. Context system access layer 140 and/or query execution engines 180 may be effective to direct executable processes associated with the same entity to the same host. For example, a list of requests of a particular pending request agent 190 may be associated with a particular device ID. A particular host (e.g., host 142b) may be associated with (or assigned to) the particular device ID. A query execution engine 180 may generate one or more processes associated with the requests and may send all the executable processes associated with the relevant entity to the same host (e.g., to host 142b). Although depicted as part of context system access layer 140, query execution engines 180 may instead be local to hosts 142a, 142b, . . . , 142n. In at least some examples, one or more query execution engines 180 may be associated with a particular host among hosts 142a, 142b, . . . , 142n.

Query execution engine 180 may determine redundancy in the list of requests in a pending request agent 190. For example, if a first request and a second request for a particular entity (e.g., a particular account ID) may be identical, with each request being a request for a value of a database field "A". Query execution engine 180 may determine the redundancy between the first request and the second request by referencing the first request and the second request in the relevant pending request agent 190. Thereafter, query execution engine 180 may generate a first executable process (e.g., a query) corresponding to one of the requests (e.g., the first request). Query execution engine 180 may send the executable process to a host associated with the particular account ID. Query execution engine 180 may send an instruction to cache the result of the executable process. Additionally, in some examples, query execution engine 180 may store the result in a cache accessible by query execution engine 180. Thereafter, query execution engine 180 may provide the previously cached result of the first executable process in response to the redundant request (e.g., the second request).

In various examples, requests of pending request agents 190 may be associated with timestamps. Accordingly, in some examples, query execution engine 180 may use the earliest redundant request to perform the executable operation, while later requests may use the cached result of the earlier request. Such an architecture may reduce the compute load on the hosts 142a, 142b, . . . , 142n by exploiting redundancy among requests and reducing lookup operations using shared execution caching. Additionally, the architecture described herein may reduce latency from the perspective of the requesting speech-processing component. In various further examples, query execution engine 180 may generate an executable instruction for the request that includes the largest amount (or greater than threshold amount) of redundant requests and may cache the returned results. For example, a first request received at time t=0 may request fields A and B. A second request received at time t=1 may request fields A, B, and E. A third request received at time t=2 may request fields A, B, C, D, and E. Although, the third request may have been received at a later point in time relative to the first and second request, in some examples, the query execution engine 180 may generate an executable instruction corresponding to the third request first and may cache the retrieved fields. Thereafter, cached results for fields A and B may be provided in response to the first request and cached results for fields A, B, and E, may be provided in response to the second request.

Query execution engine 180, whether executed on a host 142a, 142b, . . . , 142n or as part of context system access layer 140, may be effective to perform a process 192. Process 192 is depicted in dashed lines in FIG. 1 to illustrate that it is a process and not a system block representing a component of system 100. Prior to the start of process 192, one or more contextual data requests may be generated. For example, a first contextual data request related to the request ID 2356 may be generated by an NLU component to determine an intent hypothesis. The first contextual data request may be a request for account information related to the request ID. Similarly, a second contextual data request related to the request ID 2356 may be generated by a skill to which the intent has been passed. The second contextual data request may also be a request for at least some of the same account information related to the request ID as in the first contextual data request. Context system access layer 140 and/or a query execution engine 180 may route both the first and second contextual data requests to a host associated with the entity identifier data. In the example, the entity identifier data may be the request ID 2356. In the example, host 142a may be associated with request ID 2356. Accordingly, the first and second contextual data requests may be sent to host 142a and may be stored by a pending request agent 190 associated with host 142a.

At action 194, a query execution engine 180 associated with host 142a may analyze the pending request agent 190 associated with host 142a for redundancy. The query execution engine 180 may determine that both the first and second contextual data requests include a request for a field of a database storing an account number. Accordingly, at action 196, the query execution engine 180 may generate an executable instruction for a processor of host 142a to retrieve the account number from the field of the database and may store the account number in a cache. The cache may be local to host 142a or local to context system access layer 140. At action 198, query execution engine 180 may provide the account number stored in the cache in response to the first context data request generated by the NLU and the second context data request generated by the skill (and in response to any additional requests for the account number in pending request agent 190). Accordingly, by routing speech processing contextual data requests related to the same entity to the same host, redundancy among requests can be exploited and the number of new executable processes generated by the host may be limited.

Additionally, as previously described, query execution engines 180 may comprise prefetching logic programmed to determine particular database fields to prefetch based on current and/or past processes (e.g., queries). Probability thresholds may be used to determine whether or not to prefetch a particular field. For example, a query execution engine may determine that a query directed to return the value of field A is followed by a query to return the value of field B 91% of the time. In the example, the query execution engine may prefetch any field that has a probability of greater than or equal to 85% of being queries given that a previous field has been queried. Accordingly, in the example, the query execution engine may prefetch field B prior to receiving a query request to fetch field B.

In FIG. 1, device 110 may receive audio including a spoken utterance of a user via a microphone (or array of microphones) of the device 110. The device 110 may generate input audio data corresponding to the audio, and may send the input audio data to the speech processing system 120 for processing. Alternatively, device 110 (or another device) may receive text input by the user via either a physical keyboard or virtual keyboard presented on a touch sensitive display of the device 110. The device 110 may generate input text data corresponding to the text, and may send the input text data to the speech processing system 120 for processing. In other embodiments, the device 110 may detect spoken commands and perform speech recognition processing locally at the device 110 in order to translate those spoken commands into text data, which the device 110 then sends to the speech processing system 120.

The speech processing system 120 receives input data from a device 110. If the input data is the input audio data from the device 110, the speech processing system 120 performs speech recognition processing (e.g., ASR) on the input audio data to generate input text data. The speech processing system 120 performs natural language processing on input text data (either received from the device 110 or generated from the input audio data received from the device 110) to determine a user command. In various examples, the natural language processing may use contextual data provided by context aggregator system 138. In some further examples, the natural language processing may produce contextual data that may then be stored in context aggregator system 138. Some examples of contextual data may include preceding utterance (e.g., an utterance from a previous turn of dialog), previous speech processing system response, on-screen entities, connected devices, user preferences, device identifiers, etc. A user command may correspond to a user request for the system to output content to the user. The requested content to be output may correspond to music, video, search results, weather information, etc. Accordingly, to publish contextual information to context aggregator system 138 and/or retrieve information from context aggregator system 138, speech processing components (e.g., NLU, skills, etc.) may send requests to context system access layer 140. As described above, requests may be partitioned based on a particular partition key that defines a particular entity. Requests for the relevant entity may be stored by a pending request agent 190. A query execution engine 180 may thereafter process the requests by generating executable processes that may be executed by a particular host, as described above.

The speech processing system 120 determines output content responsive to the user command. The output content may be received from a first party (1P) skill (e.g., an skill controlled or managed by the natural language speech processing system 120 or by the company or entity controlling the speech processing system 120) or a third party (3P) skill (e.g., an skill managed by another computing device(s) in communication with the speech processing system 120 but not controlled or managed by the speech processing system 120 or by the entity controlling the speech processing system 120). In various examples, the speech processing system 120 and/or the skill generating the output content may consume contextual data to determine the output content. Similarly, in various examples, the speech processing system 120 and/or the skill may generate new contextual data during the interaction with the user and may store such contextual data in context aggregator system 138 using context access layer 140.

The speech processing system 120 sends back to the initiating device (110) output data including the output content responsive to the user command. The device (110) may emit the output data as audio, present the output data on a display, or perform some other operation responsive to the user command. The speech processing system 120 may determine output content responsive to the user command by performing an action. For example, in response to the user command, the speech processing system 120 may determine one or more actions that correspond to the user command and may select one of the actions to perform. Examples of actions include launching an skill (e.g., sending dialog data or other data to a specific skill to be processed, which may correspond to a dispatch request), performing disambiguation (e.g., determining that the speech processing system 120 doesn't have enough information to execute a command and generating a dialog request that requests additional information from the user), confirming the action with a user (e.g., generating audio data and/or display data indicating the action to be performed and requesting confirmation from the user), displaying information to the user (e.g., generating display data in response to the user command, such as displaying a second page of content), playing audio information for the user (e.g., generating audio data in response to the user command, such as indicating that the skill is being launched, that a volume has been changed, and/or the like), or the like.

The speech processing system may operate using various components as illustrated in and described with respect to FIG. 2. The various components illustrated in FIG. 2 may be located on a same or different physical device. Communication between various components illustrated in FIG. 2 may occur directly or across a network(s) 104.

An audio capture component, such as a microphone or array of microphones of a device 110, captures the input audio corresponding to a spoken utterance. The device 110, using a wakeword detection component, processes audio data comprising a digital representation of the input audio to determine if a keyword (e.g., a wakeword) is detected in the audio data. Following detection of a wakeword, the device 110 sends the audio data corresponding to the utterance to a speech processing system 120 for processing.

Upon receipt by the speech processing system 120, the audio data may be sent to an orchestrator 230. The orchestrator 230 may include memory and logic that enable the orchestrator 230 to transmit various pieces and forms of data to various components of the system.

In general, upon receipt of input audio data 205, the orchestrator 230 sends the input audio data 205 to a speech recognition component 249 of the speech processing system 120. Speech recognition component 249 may transcribe the audio data into text data representing words of speech contained in the audio data. The speech recognition component 249 interprets the spoken utterance based on a similarity between the spoken utterance and pre-established language models. For example, the speech recognition component 249 may compare the audio data with models for sounds (e.g., subword units or phonemes) and sequences of sounds to identify words that match the sequence of sounds spoken in the utterance of the audio data.

In various examples, orchestrator 230 may send the results of speech recognition processing (e.g., text data representing speech) to shortlister component 241. Shortlister component 241 may use machine learning techniques to determine a set of probabilities that the user utterance is intended to invoke each skill of a set of skills for which the shortlister component 241 has been trained. Each probability represents a likelihood that the particular skill is appropriate to process the utterance. Thereafter, in some examples, the shortlister component 241, orchestrator 230, natural language component 259, and/or another processing component of speech processing system 120, may determine a subset of the skills for which the utterance is appropriate by ranking or otherwise sorting the skills based on the determined probabilities for each skill. The subset of skills and/or the probabilities generated by shortlister component 241 may be provided to the natural language component 259 to reduce the computational load of the natural language component 259 when determining an appropriate skill to process the utterance. As described in further detail below, the natural language component 259 may generate N-best Intents data 215 representing an N-best list of the top scoring intents associated with the utterance (as received by the speech processing system 120 as either a spoken utterance or textual input) to the orchestrator 230 based on the subset of skills and/or the skill-specific probabilities determined by shortlister component 241.

Results of speech recognition processing (e.g., text data representing speech) are processed by a natural language component 259 of the speech processing system 120. The natural language component 259 attempts to make a semantic interpretation of the text data. That is, the natural language component 259 determines the meaning behind the text data based on the individual words in the text data and then implements that meaning. As previously described, the natural language component 259 may use contextual data along with the text data representing speech to generate a semantic representation of the input text. The natural language component 259 interprets a text string to derive an intent or a desired action from the user as well as the pertinent pieces of information in the text data that allow a device (e.g., the device 110, the speech processing system 120, etc.) to complete that action. For example, if a spoken utterance is processed using the speech recognition component 249, which outputs the text data "call mom", the natural language component 259 may determine the user intended to activate a telephone in his/her device and to initiate a call with a contact matching the entity "mom."

The natural language component 259 may be configured to determine a "domain" of the utterance so as to determine and narrow down which skills offered by an endpoint device (e.g., the speech processing system 120 or the device 110) may be relevant. For example, an endpoint device may offer services relating to interactions with a telephone skill, a contact list skill, a calendar/scheduling skill, a music player skill, etc. Words in a single textual interpretation may implicate more than one skill, and some skills may be functionally linked (e.g., both a telephone skill and a calendar skill may utilize data from a contact list). In various examples, a domain may be associated with a set of skills. In various examples, some skills may be specific to a particular domain. In some examples, other skills may be applicable to multiple domains.

In various examples, speech processing techniques may determine a confidence score (sometimes referred to herein as a "confidence value") for each of the identified intents (e.g., the "play movie", "play audiobook", and "play music" intents). In some examples, a ranker component may be used to rank the determined intents based on user and/or device data. Speech processing systems may send the intent associated with the highest rank to an skill effective to execute the intent. Traditionally, data representing the other intents (e.g., intents/domains other than the highest ranked intent/domain) is not stored by the speech processing system. Accordingly, in traditional speech processing systems, if the user's intention does not match with the system-selected domain/intent, the user may be required to request that the system stop and may rephrase the request. Such a scenario requires an additional call to natural language component 259 as well as to the ranker component to generate an additional ranked list. Additionally, requiring the user to rephrase the request may result in user frustration and a diminished user experience.

In various examples, the natural language component 259 may include a recognizer that includes a named entity resolution (NER) component configured to parse and tag to annotate text as part of natural language processing. For example, for the text "call mom," "call" may be tagged as a command to execute a phone call and "mom" may be tagged as a specific entity and target of the command. Moreover, the telephone number for the entity corresponding to "mom" stored in a contact list may be included in the NLU results. Further, the natural language component 259 may be used to provide answer data in response to queries, for example using a natural language knowledge base.

In natural language processing, a domain may represent a discrete set of activities having a common theme, such as "shopping," "music,", "movie", "calendaring," "communications," etc. As such, each domain may be associated with a particular recognizer, language model and/or grammar database, a particular set of intents/actions, and a particular personalized lexicon. Each gazetteer may include domain-indexed lexical information associated with a particular user and/or device. A user's music-domain lexical information (e.g., a gazetteer associated with the user for a music domain) might correspond to album titles, artist names, and song names, for example, whereas a user's contact-list lexical information (e.g., a gazetteer associated with the user for a contact domain) might include the names of contacts. Since every user's music collection and contact list is presumably different, this personalized information improves entity resolution. A lexicon may represent what particular data for a domain is associated with a particular user. The form of the lexicon for a particular domain may be a data structure, such as a gazetteer. A gazetteer may be represented as vector data with many bit values, where each bit indicates whether a data point associated with the bit is associated with a particular user. For example, a music gazetteer may include one or more long vectors, each representing a particular group of musical items (such as albums, songs, artists, etc.) where the vector includes positive bit values for musical items that belong in the user's approved music list. Thus, for a song gazetteer, each bit may be associated with a particular song, and for a particular user's song gazetteer the bit value may be 1 if the song is in the particular user's music list. Other data structure forms for gazetteers or other lexicons are also possible.

As noted above, in traditional natural language processing, text data may be processed applying the rules, models, and information applicable to each identified domain. For example, if text represented in text data potentially implicates both communications and music, the text data may, substantially in parallel, be natural language processed using the grammar models and lexical information for communications, and natural language processed using the grammar models and lexical information for music. The responses based on the text data produced by each set of models is scored, with the overall highest ranked result from all applied domains being ordinarily selected to be the correct result. The shortlister component 241 may reduce the computational burden of the natural language component 259 by processing the text data based on the skill-specific probabilities determined by shortlister component 241. For example, natural language processing by the natural language component 259 may be performed for the n skills having the highest probabilities that the skill is programmed to process and/or respond to the user utterance and/or the text data.

A downstream process called named entity resolution may link a text portion to an actual specific entity known to the system. To perform named entity resolution, the system may utilize gazetteer information stored in an entity library storage. The gazetteer information may be used for entity resolution, for example matching speech recognition results with different entities (e.g., song titles, contact names, etc.). Gazetteers may be linked to users (e.g., a particular gazetteer may be associated with a specific user's music collection), may be linked to certain domains (e.g., shopping, music, communications), or may be organized in a variety of other ways. The NER component may also determine whether a word refers to an entity that is not explicitly mentioned in the text data, for example "him," "her," "it" or other anaphora, exophora or the like.

A recognizer of the natural language component 259 may also include an intent classification (IC) component that processes text data to determine an intent(s), where the intent(s) corresponds to the action to be performed that is responsive to the user command represented in the text data. Each recognizer is associated with a database of words linked to intents. For example, a music intent database may link words and phrases such as "quiet," "volume off," and "mute" to a "mute" intent. The IC component identifies potential intents by comparing words in the text data to the words and phrases in the intents database. Traditionally, the IC component determines using a set of rules or templates that are processed against the incoming text data to identify a matching intent.

In order to generate a particular interpreted response, the NER component applies the grammar models and lexical information associated with the respective recognizer to recognize a mention of one or more entities in the text represented in the text data. In this manner the NER component identifies "slots" (i.e., particular words in text data) that may be needed for later command processing. Depending on the complexity of the NER component, it may also label each slot with a type (e.g., noun, place, city, artist name, song name, or the like). Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by the IC component are linked to domain-specific grammar frameworks with "slots" or "fields" to be filled. Each slot/field corresponds to a portion of the text data that the system believes corresponds to an entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER component may parse the text data to identify words as subject, object, verb, preposition, etc., based on grammar rules and/or models, prior to recognizing named entities. The identified verb may be used by the IC component to identify intent, which is then used by the NER component to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component then searches the corresponding fields in the domain-specific and personalized lexicon(s), attempting to match words and phrases in the text data tagged as a grammatical object or object modifier with those identified in the database(s). As used herein, "intent data" may correspond to the intent itself, framework(s) for the intent, slot(s)/field(s) corresponding to the intent, object modifier(s), any information associated with the intent/framework(s)/slot(s), or any combination thereof without departing from the disclosure.

To illustrate an example, a command of "book me a plane ticket from Boston to Seattle for July 5" may be associated with a <BookPlaneTicket> intent. The <BookPlaneTicket> intent may be associated with a framework including various slots including, for example, <DepartureDate>, <DepartureLocation>, <ArrivalDate>, and <DestinationLocation>. In the above example, the speech processing system 120, namely the natural language component 259, may populate the framework as follows: <DepartureDate: July 5>, <DepartureLocation: Boston>, <ArrivalDate: July 5>, and <DestinationLocation: Seattle>.

This process includes semantic tagging, which is the labeling of a word or combination of words according to their type/semantic meaning. Parsing may be performed using heuristic grammar rules, or the NER component may be constructed using techniques such as Hidden Markov models (HMMs), maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component will determine corresponds to the "play music" intent. Additionally, in at least some examples, probability data generated by shortlister component 241 may indicate a high likelihood that the "play music" intent is appropriate as the highest probability skills for the user utterance correspond to music skills. At this stage, no determination has been made as to the meaning of "mother's little helper" and "the rolling stones," but based on grammar rules and models, it is determined that the text of these phrases relate to the grammatical object (i.e., entity) of the text data.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component may search a database of generic words associated with the domain. For example, if the text data corresponds to "play songs by the rolling stones," after failing to determine an album name or song name called "songs" by "the rolling stones," the NER component may search the domain vocabulary for the word "songs." In the alternative, generic words may be checked before the gazetteer information, or both may be tried, potentially producing two different results.

The results of natural language processing may be tagged to attribute meaning to the text data. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The results of natural language processing may be sent to a skill 290, which may be located on a same or separate computing device as part of a system. The system may include more than one skill 290, and the destination skill 290 may be determined based on the natural language processing results and may be selected from the subset of skills determined by shortlister component 241 and/or by another component of speech processing system 120 based on the probabilities determined by shortlister component 241. For example, if the natural language processing results include a command to play music, the destination skill 290 may be a music playing skill, such as one located on the device 110 or in a music playing appliance, configured to execute a music playing command. If the natural language processing results include a search request (e.g., requesting the return of search results), the skill 290 selected may include a search engine skill, such as one located on a search server, configured to execute a search command and determine search results, which may include output text data to be processed by a text-to-speech engine and output from a device as synthesized speech.

The speech processing system 120 may include a user recognition component. The user recognition component may take as input the audio data as well as the text data output by the speech recognition component 249. The user recognition component may receive the text data from the speech recognition component 249 either directly or indirectly via the orchestrator 230. Alternatively, the user recognition component may be implemented as part of the speech recognition component 249. The user recognition component determines respective scores indicating whether the utterance in the audio data was spoken by particular users. The user recognition component also determines an overall confidence regarding the accuracy of user recognition operations. User recognition may involve comparing speech characteristics in the audio data to stored speech characteristics of users. User recognition may also involve comparing biometric data (e.g., fingerprint data, iris data, etc.) received by the user recognition component to stored biometric data of users. User recognition may further involve comparing image data including a representation of at least a feature of a user with stored image data including representations of features of users. It should be appreciated that other kinds of user recognition processes, including those known in the art, may be used. Output of the user recognition component may be used to inform natural language processing as well as processing performed by 1P and 3P skills 290.

The speech processing system 120 may additionally include a user profile storage. The user profile storage may include data regarding user accounts. The user profile storage may be implemented as part of the speech processing system 120. However, it should be appreciated that the user profile storage may be located proximate to the speech processing system 120, or may otherwise be in communication with the speech processing system 120, for example over the network(s) 104. The user profile storage may include a variety of information related to individual users, accounts, etc. that interact with the system.

FIG. 2 illustrates a 1P skill 290 of the system. However, it should be appreciated that the data sent to a 1P skill 290 may also, or instead, be sent to 3P skill computing device(s) executing 3P skills.

Application, as used herein, may be considered synonymous with a skill. A "skill" may correspond to a domain and may be software running on a speech processing system 120 and akin to an application. That is, a skill may enable a speech processing system 120 or another application computing device(s) to execute specific functionality in order to provide data or produce some other output called for by a user. The system may be configured with more than one skill. For example a weather skill may enable the speech processing system 120 to execute a command with respect to a weather skill computing device(s), a car skill may enable the speech processing system 120 to execute a command with respect to a taxi skill computing device(s), an order pizza skill may enable the speech processing system 120 to execute a command with respect to a restaurant computing device(s), etc.

While the examples illustrated above describe discrete skills associated with a specific system, the disclosure is not limited thereto and a skill may be associated with specific and/or general functions, including system functions associated with the speech processing system 120. For example, the speech recognition component 249, the shortlister component 241, the natural language component 259, or the like may correspond to an application running on the speech processing system 120 (e.g., the speech processing system 120 sends input data to the application and the application generates output data). In general, an application or a skill may refer to a system process running on the speech processing system 120, a first party skill running on the speech processing system 120, a third party skill running on the speech processing system 120, and/or the like without departing from the disclosure.

Output of the skill 290 may be in the form of text data to be conveyed to a user. As such, the skill output text data may be sent to a text-to-speech (TTS) component 280 either directly or indirectly via the orchestrator 230. The TTS component 280 may synthesize speech corresponding to the received text data. Speech audio data synthesized by the TTS component 280 may be sent to a device 110 for output to a user.

The TTS component 280 may perform speech synthesis using one or more different methods. In one method of synthesis called unit selection, the TTS component 280 matches the text data or a derivative thereof against a database of recorded speech. Matching units are selected and concatenated together to form speech audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The speech processing system 120 may further operate using various components as illustrated in and described with respect to FIG. 2. The speech recognition component 249 receives [1a] input audio data 205 from the orchestrator 230. Additionally, in some examples, the speech recognition component 249 may receive [1b] contextual data from orchestrator 230. Contextual data may be retrieved by orchestrator from context aggregator system 138. The speech recognition component 249 processes the input audio data 205 to generate an N-best list of text possibly representing an utterance in the input audio data 205. The speech recognition component 249 outputs [2] N-best recognitions data 210, including text representing the generated N-best recognitions, to the orchestrator 230.

Shortlister component 241 may receive [3a] the N-best recognitions data 210 from the orchestrator 230. Shortlister component 241 may be trained using a set of skills. As described in further detail below, for each skill in the set of skills, shortlister component 241 may determine a probability (e.g., a score) that the skill is applicable to generate a response to the utterance. Shortlister component 241 may send [3c] the subset of skills and/or the determined probabilities to orchestrator 230. In various examples, to the extent that the natural language component 259, the dialog state manager 240, the core dialog manager 260, and/or other components of speech processing system 120 select an skill to process the utterance (and/or input text), the natural language component 259, the dialog state manager 240, the core dialog manager 260, and/or other components of speech processing system 120 may select the skill from the subset of skills and/or based on the probabilities determined by shortlister component 241.

The natural language component 259 receives [3a] the N-best recognitions data 210, [3b] the relevant contextual data, the skill-specific probabilities determined by shortlister component 241, and/or the subset of skills determined by shortlister component 241 or by some other processing unit from the orchestrator 230. The natural language component 259 processes the N-best recognitions data 210, the relevant contextual data, the skill-specific probabilities, and/or the subset of skills to determine one or more domains of the speech processing system 120 for the utterance. Each domain may be associated with a separate recognizer implemented within the natural language component 259. A recognizer may include an NER component and an IC component as described above. The natural language component 259 outputs [4a] N-best intents data 215, representing an N-best list of the top scoring intents associated with the utterance (as received by the speech processing system 120 as either a spoken utterance or textual input) to the orchestrator 230. Additionally, the orchestrator 230 may send [5] the input audio data 205, the N-best recognitions data 210, the N-best intents data 215, the subset of skills, the skill-specific probabilities determined by shortlister component 241, additional data, and/or any combination thereof to the dialog state manager 240.

The speech processing system 120 may be configured in communication with context aggregator system 138 (although, in FIG. 2, context aggregator system 138 is depicted as a one of the components of the speech processing system, for purposes of illustration). A context aggregator system 138 may be configured to output non-user specific contextual data, such as temporal information (e.g., time of day). A context aggregator system 138 may also be configured to output metadata associated with the device from which the user command was received. Examples of device metadata may include the type of device (e.g., car, phone, speaker, etc.), the device ID, a request ID representing a natural language input to speech processing system 120, etc. A context aggregator system 138 may further be configured to output data indicating previously received user commands and their determined intents. The context aggregator system 138 may store and provide access to contextual data 225, which may include information about the dialog context and/or other information. Thus, FIG. 2 illustrates the context aggregator system 138 sending the contextual data 225 to the dialog state manager 240. However, the disclosure is not limited thereto and the context aggregator system 138 may send the contextual data 225 to the dialog state manager 240, [1b] to the speech recognition component, [3b] to the natural language component 259, to a ranker component, and/or the orchestrator 230 without departing from the disclosure. In various examples, context aggregator system 138 may comprise a query execution engine 180 effective to generate executable processes for storing and/or retrieving contextual data from underlying hosts 142a, 142b, 142n (shown in FIG. 1). As described in further detail below, query execution engine 180 may be effective to send executable processes related to the same entity to the same host. Additionally, query execution engine 180 may reorder and/or delay generation of executable processes in order to exploit redundancy among requested data. Query execution engine 180 may send instructions to the underlying hosts to cache the results of one or more query operations in a local cache and/or to use cached results to service a particular query. Additionally, in some examples, query execution engine 180 may send instructions to the underlying host to prefetch particular data based on the probability that a particular field will be requested exceeding a probability threshold.

For example, speech recognition component 249 may request, through orchestrator 230, first contextual data stored in a first field of a first database of context aggregator system 138 during generation of N-best recognitions data 210. Natural language component 259 may request the first contextual data stored in a first field of the first database of context aggregator system 138 during generation of N-best intents data 215. The query execution engine 180 of context aggregator system 138 may generate an executable process to retrieve the first contextual data stored in the first field and may store the first contextual data in a cache of context aggregator system 138. Thereafter, context aggregator system 138 may provide the cached first contextual data in response to the redundant requests (e.g., requests from speech recognition component 249, natural language component 259, a skill ranker component, skill 290, etc.).

In some examples, the context aggregator system 138 may include additional information relevant to skills and/or intents. For example, the context aggregator system 138 may include information about skill ratings (e.g., 5 star rating for a first skill and a 4 star rating for a second skill), enabling the speech processing system 120 to differentiate between similar skills based on ratings. Additionally or alternatively, the context aggregator system 138 may have location information associated with skills, enabling the speech processing system 120 to select the first skill in a first location and the second skill in a second location. For example, the first skill (e.g., Skill A corresponding to a first transportation company) may not have availability in certain cities, while the second skill (e.g., Skill B, corresponding to a second transportation company) has availability, so the speech processing system 120 may select the second skill when the user requests a cab in locations that the first skill lacks coverage.

Similarly, the context aggregator system 138 may include information about context of a user request, enabling the speech processing system 120 to select a first skill based on a first user request but select a second skill based on a second user request. For example, a first user request (e.g., "What is the weather?") may result in the speech processing system 120 choosing a first skill (e.g., Weather skill), whereas a second user request (e.g., "What is the wind?") may result in the speech processing system 120 choosing a second skill (e.g., PredictWind skill), despite the similarity in the user requests.

The speech processing system 120 may additionally include one or more personal graph systems 229. A personal graph system 229 may track user interactions with the system 100 and store previous interactions, user preferences and/or other user-specific information used to build a user profile. Thus, the personal graph systems 229 may generate personal graph data 255 and may send [7] the personal graph data to the dialog state manager 240 to include in the dialog state. In some examples, the personal graph data includes information specific to the current dialog state. For example, if the user request indicates that the user would like to request a ride, the personal graph data may indicate a first number of times that the user has used a first skill (e.g., Skill A) and a second number of times that the user has used a second skill (e.g., Skill B). This information is specific to the user but also relevant to the current dialog state. However, the disclosure is not limited thereto and the personal graph data may include additional information without departing from the disclosure.

While the abovementioned examples illustrate the personal graph system 229 being tailored to a specific user, the disclosure is not limited thereto. In some examples, the personal graph system 229 may provide information according to different hierarchies. As discussed above, the personal graph system 229 may provide profile data on a user level (e.g., based on a system interaction history specific to a user ID associated with a user from which the current command originated). In addition, the personal graph system 229 may alternatively provide profile data on a device level (e.g., based on a system interaction history specific to a device ID associated with the device from which data corresponding to the current command was received). Additionally or alternatively, the personal graph system 229 may provide profile data on a user and device level (e.g., based on a system interaction history specific to a user ID as well as a device ID).

The dialog state manager 240 may receive [5] various inputs from the orchestrator 230, such as the input audio data 205, the N-best recognitions data 210, the subset of skills and/or the skill probabilities determined by shortlister component 241, and/or the N-best intents data 215. In addition, the dialog state manager 240 may receive [6] the contextual data 225 from the context aggregator system 138 and may receive [7] the personal graph data from the personal graph system 229. The dialog state manager 240 may generate dialog state data 245, including all of the data received that is associated with a current exchange with the user. The dialog state manager 240 may send [8] the dialog state to the user satisfaction estimator 250.

The user satisfaction estimator 250 may receive [8] the dialog state data 245 and may generate user satisfaction data 256, which may be a scalar value (e.g., between 1 and 5) that corresponds to an estimate of user satisfaction at a particular point in time. The user satisfaction estimator 250 may send [9] the user satisfaction data 256 to the dialog state manager 240 and the dialog state manager 240 may update the dialog state data 245 to include the user satisfaction data 256.

The dialog state manager 240 may send [10] the dialog state data 245 to the orchestrator 230 and/or the core dialog manager 260. Additionally or alternatively, the orchestrator 230 may send [11] the updated dialog state to the core dialog manager 260. The core dialog manager 260 may use rule-based candidate generators and/or machine learning candidate generators (e.g., Deep Neural Network (DNN) generators) to generate candidate actions and/or skills based on the dialog state data 245 and may use rule-based selectors and/or machine learning selectors (e.g., DNN selectors) to select a single action from the candidate actions. Similarly, the core dialog manager 260 may use rule-based candidate selectors and/or machine learning candidate selectors (e.g., DNN selectors) to select a single skill from the candidate skills to perform the action. The core dialog manager 260 may generate action data 265 that indicates the selected action, which may correspond to a dialog request or a dispatch request, and may send [12] the action data 265 to the orchestrator 230 and/or the dialog state manager 240 (e.g., via the orchestrator 230).

The dialog state manager 240 may receive [13] the action data 265 and may update the dialog state data 245 again to include the action data 265. The dialog state manager 240 may send [14] the updated dialog state data 245 to the orchestrator 230, which may send [15] the updated dialog state data 245 to a dialog execution engine 270. The dialog execution engine 270 may receive [15] the updated dialog state data 245, including the action data 265, and may determine whether the action data 265 indicates that the dialog execution engine 270 should dispatch the action to a skill (e.g., dispatch request) or to generate a prompt requesting additional information from the user (e.g., dialog request). For example, if the action data 265 includes a dispatch request, the dialog execution engine 270 may send [16A] the action data 265 and/or the dialog state data 245 to the skill 290 specified by the action data 265. The skill 290 may use rule-based action generators to generate candidate actions based on the dialog state data 245 and may use rule-based selectors and/or machine learning selectors (e.g., DNN selectors) to select a single action from the candidate actions. The skill 290 may generate a prompt corresponding to the selected action and may generate an updated dialog state, which may be sent [17A] to the TTS component 280.

In contrast, if the action data 265 includes a dialog request, the dialog execution engine 270 may generate a prompt soliciting additional information from the user and may send [16B] the prompt and/or the dialog state data 245 to the TTS component 280. The solicitation may take the form of text output via a display of a user device or audio output by a speaker of a user device. Accordingly, if the solicitation to the user is to be audio, the TTS component 280 may generate output data 285 that includes output audio data based on the text data of the prompt. If the solicitation to the user does not include audio, the TTS component 280 may generate output data 285 that only includes the text data of the prompt. The TTS component 280 may send [18] the output data 285 and/or additional data received from the dialog execution engine 270 or the skill 290 to the orchestrator 230 and the orchestrator 230 may send [19] the output data 285 and/or the additional data to the dialog state manager 240, which may update the dialog state data 245 again.

In some examples, the core dialog manager 260 may determine that the dialog state data 245 includes enough information to select an action and generate a dispatch request to dispatch the selected action and/or dialog state to the selected skill. For example, in response to a user request to "book me a cab to Favorite Bar," the core dialog manager 260 may determine that the intent is to book a cab (e.g., GetCabIntent) and may generate candidate actions associated with booking a cab, such as a first action using a first skill (e.g., Skill A) and a second action using a second skill (e.g., Skill B). In various examples, Skill A and Skill B may be included in a subset of skills determined by shortlister component 241 for the utterance "book me a cab to Favorite Bar". In various other examples, the probabilities that Skill A and Skill B are appropriate skills to process the utterance "book me a cab to Favorite Bar" may exceed a probability threshold. In still other examples, the probabilities that Skill A and Skill B are appropriate skills to process the utterance "book me a cab to Favorite Bar" may be among the highest probabilities determined by shortlister component 241 for the set of skills for which shortlister component 241 has been trained. The core dialog manager 260 may communicate with the first skill and/or the second skill to acquire more information, such as whether cars are available (e.g., Skill A indicates that no cars are available for 30 minutes, whereas Skill B indicates that a car is available within 5 minutes). Based on the dialog state data 245 and the additional information, the core dialog manager 260 may select the second action and generate a dispatch command, with the action data 265 indicating that the system 100 should dispatch the second action to the second skill.

In some examples, dispatching the second action to the second skill corresponds to sending the second action (e.g., Dispatch(Skill B: GetCabIntent(Current location: 2121 7$^{th}$ Avenue Seattle, Destination: Favorite Bar)) to the second skill for execution. However, the second action is determined by the core dialog manager 260 processing the dialog state data 245 and the core dialog manager 260 is not specifically trained for intents/actions associated with the second skill. Therefore, dispatching the second action to the second skill may instead correspond to updating the dialog state data 245 with the second action and/or any additional information and sending the dialog state data 245 to the second skill for further processing. For example, the core dialog manager 260 may send the selected action (e.g., Dispatch(Skill B: GetCabIntent(Current location: 2121 7$^{th}$ Avenue Seattle, Destination: Favorite Bar)), the additional information (e.g., Skill A indicates that cars are not available for 30 minutes, Skill B indicates that cars are available within 5 minutes) and/or any other information (e.g., Reason: Skill A outage) to the dialog state manager 240, the dialog state manager 240 may update the dialog state data 245 accordingly and the updated dialog state data 245 may be sent to the second skill.

While the examples described above illustrate the second action including an intent (e.g., Dispatch(Skill B: GetCabIntent)), the disclosure is not limited thereto and the second action may only correspond to dispatching to the second skill (e.g., Dispatch(Skill B)). Thus, the core dialog manager 260 may generate candidate actions corresponding to a specific intent associated with a specific skill, or the candidate actions may correspond to a specific skill regardless of intent. To illustrate an example of the candidate actions including specific intents, the core dialog manager 260 may generate Dispatch(Skill B: GetCabIntent), Dispatch(Skill B: ViewNearbyCabsIntent), Dispatch(Skill A: GetCabIntent), Dispatch(Skill A: ViewNearbyCabsIntent), etc. and selecting a single action indicates both the skill (e.g., Skill A or Skill B) and the intent (e.g., GetCabIntent or ViewNearbyCabsIntent). Thus, selecting the candidate action corresponds to selecting an intent associated with a specific skill, which may assist the core dialog manager 260 in selecting between different skills. Additionally or alternatively, the core dialog manager 260 may generate candidate actions based on available skills, regardless of intent. For example, the core dialog manager 260 may generate Dispatch(Skill A), Dispatch(Skill B), etc. and selecting a single action indicates the skill to which to dispatch the dialog state data 245. Thus, selecting the candidate action corresponds to sending the dialog state data 245 to the specific skill (e.g., Skill B) and the skill determines the intent. Additionally or alternatively, the core dialog manager 260 may generate candidate actions based on the skill probabilities determined by shortlister component 241 and included in dialog state data 245.

In some examples, the core dialog manager 260 may determine that the dialog state data 245 does not include enough information to select an action and generate a dispatch command to dispatch the selected action and/or dialog state to a corresponding skill. Instead, the core dialog manager 260 may determine that additional information is needed from the user and may generate a dialog request to solicit the user for the additional information. For example, if the core dialog manager 260 determines one or more intents/actions that may correspond to the speech, but none of the intents/actions are associated with a confidence value meeting or exceeding a threshold value, the core dialog manager 260 may generate a dialog request that requests additional information. While the core dialog manager 260 may dispatch an action despite the confidence score being below the threshold value, a lower confidence score corresponds to an increased likelihood that the selected action is not what the user intended. Thus, dispatching the action may result in performing a command that is different than the user requested, resulting in a lower user satisfaction value after the command is executed.

In order to increase the likelihood that the action selected by the core dialog manager 260 corresponds to the user request, the core dialog manager 260 may generate a dialog request requesting additional information and/or clarification from the user. For example, in response to a request to "book a flight to Portland," the core dialog manager 260 may generate a dialog request and the speech processing system 120 may solicit the user as to whether Portland corresponds to Portland, Oreg. or Portland, Me. (e.g., "Would you like to fly to Portland, Oreg., or to Portland, Me.?"). For example, the action data 265 may include the dialog request and the dialog execution engine 270 may interpret the action data 265 to generate a prompt corresponding to the solicitation. As discussed above, the solicitation may take the form of text output via a display of a user device or audio output by a speaker of a user device. In addition, the solicitation may be output by a device different from the device that received the speech. Accordingly, if the solicitation to the user is to be audio, the TTS component 280 may generate output audio data based on the text data of the prompt and the device 110 may output audio corresponding to the output audio data.

While FIG. 2 illustrates specific routing between components, this is intended to illustrate a single example and the disclosure is not limited thereto. For example, FIG. 2 illustrates the action data 265 being sent from the core dialog manager 260 to the orchestrator 230 and from the orchestrator 230 to the dialog state manager 240, and updated dialog data (including the action data 265) being sent from the dialog state manager 240 to the orchestrator 230, from the orchestrator 230 to the dialog execution engine 270, and from the dialog execution engine 270 to the skill 290. However, the disclosure is not limited thereto and the dialog data can be routed to any of the components illustrated in FIG. 2 without departing from the disclosure. Thus, any decision making performed by any component in the system 100 may be performed using information (e.g., dialog state data 245) stored in the dialog state manager 240 without departing from the disclosure.

While FIG. 2 illustrates the core dialog manager 260 as a discrete component configured to make decisions for the system 100, and the example described above illustrates the core dialog manager 260 assisting other components in making decisions, the disclosure is not limited thereto. Instead, the core dialog manager 260 may be completely decentralized and individual components may include machine learning models that enable the component(s) to make decisions and optimize user satisfaction over time (collectively, the machine learning models may correspond to the core dialog manager 260). Thus, the core dialog manager 260 may be illustrated as a single component, as a separate component while also being included within individual components, or only within individual components (e.g., without a separate block receiving [11] dialog data and sending [12] action data) without departing from the disclosure.

Figure 3:
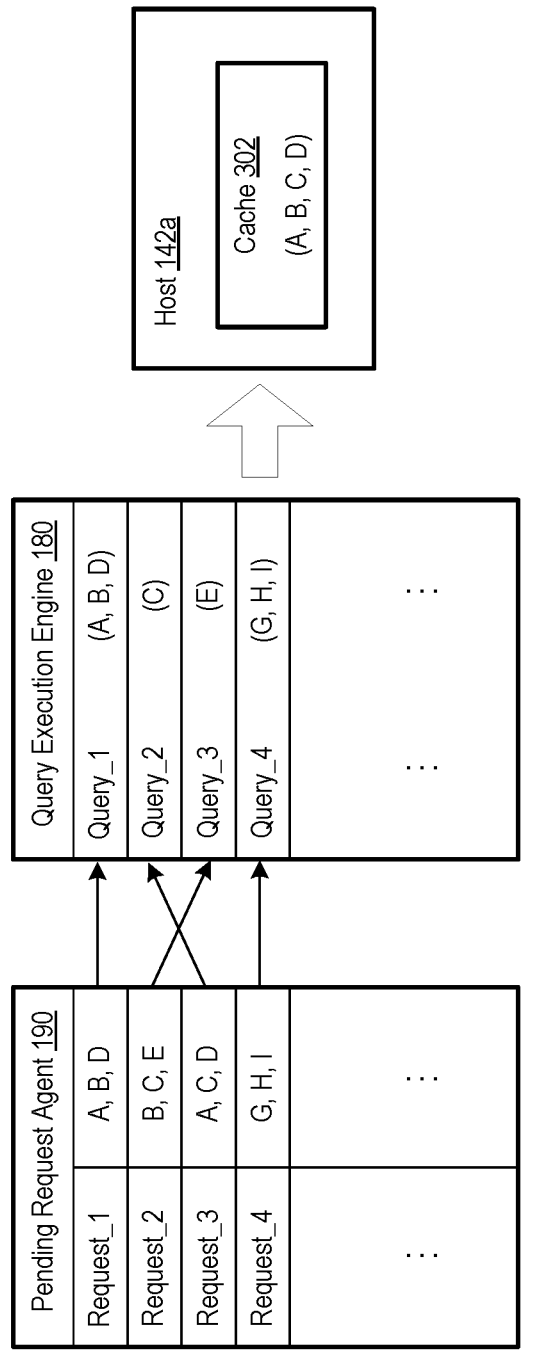
FIG. 3 depicts an example of a shared execution caching for speech processing, in accordance with various embodiments described herein.

FIG. 3 depicts an example of shared execution caching for speech processing, in accordance with various embodiments of the present disclosure. In the example depicted in FIG. 3, pending request agent 190 has received at least 4 requests (e.g., Request_1, Request_2, Request_3, and Request_4) for contextual data related to natural language processing. Each request depicted in FIG. 3 may be a request to retrieve one or more values from a specified field of a database. Additionally, each request of pending request agent 190 may be related to the same entity. In various examples, the entity may be a particular request ID, device ID, account ID, IP address, etc. In various examples, upon receipt of a request and upon placing the request in a list such as pending request agent 190, query execution engine 180 may determine an entity associated with the request. For example, query execution engine 180 may determine the request ID of each request in pending request agent 190. Thereafter, query execution engine 180 may determine a host associated with the particular entity. Executable instructions generated by query execution engine 180 in response to the request may be sent to the host associated with the relevant entity.

Query execution engine 180 may analyze the list of requests stored by pending request agent 190 for redundancy. In the example, query execution engine 180 may determine that Request_1 and Request_2 both request fetching of a value from field B. Additionally, query execution engine 180 may determine that Request_1 and Request_3 both request fetching values of fields A and D. Additionally, query execution engine 180 may determine that Request_2 and Request_3 both request fetching of a value from field C. In the example depicted in FIG. 3, Request_1, Request_2, Request_3, and Request_4 may be ordered in the order in which the requests were received (e.g., according to timestamps). Accordingly, Request_1 may have been received prior to receipt of Request_2, which may have been received prior to receipt of Request_3, which may have been received prior to receipt of Request_4. As described above, the requests may be received from one or more speech processing components (e.g., one or more components of speech processing system 120), from one or more skills, from a natural language processing component (e.g., an NLU component), from a speech recognition component, from a skill ranker or re-ranker component, etc.

In the example depicted in FIG. 3, query execution engine 180 may generate a executable process (e.g., one or more executable instructions)—Query_1 effective to be executed by host 142*a* and effective to fetch values from fields A, B, and D from a database of host 142*a*. Query execution engine 180 may generate and send an instruction for host 142*a* to cache values from fields A, B, and D in cache 302 for servicing subsequent requests, since query execution engine 180 may determine that subsequent requests of pending request agent 190 are requesting values from fields A, B, and D. In various other examples, query execution engine 180 may cache the values of fields A, B, and D in a cache associated with query execution engine 180.

Query execution engine 180 may generate Query_2. Query_2 may correspond to Request_3. However, since Query_1 has already fetched values from fields A, B, and D (now cached in cache 302 or in a cache of query execution engine 180) query execution engine 180 may generate an executable instruction (e.g., Query_2) effective to retrieve only the value from field C, since fields A and D have already been cached in response to Query_1. Query execution engine 180 may provide values from fields A and D from the cached values stored in response to Query_1. For example, query execution engine 180 may generate and send executable instructions for host 142*a* to retrieve values A and D from cache 302 in response to Query_2. Additionally, in examples where query execution engine 180 uses a local cache, query execution engine 180 may retrieve values from fields A and D from the cache local to query execution engine 180. Additionally, query execution engine 180 may cache the value from field C in cache 302 (or another cache) for servicing subsequent requests, since query execution engine 180 may determine that Request_2 (as of yet unserviced) requests the value from field C.

Query execution engine 180 may generate Query_3. Query_3 may correspond to Request_2. However, since Query_1 has already fetched values from fields A, B, and D (now cached in cache 302 or another cache) and Query_2 has already fetched the value from field C (now cached in cache 302 or another cache) query execution engine 180 may instruct host 142*a* to retrieve only the value from field E for Query_3, since fields B and C have already been cached in response to Query_1 and Query_2. In various examples, query execution engine 180 may send instructions for host 142*a* to retrieve values B and C from cache 302 (or another cache) in response to Query_3. In examples where query execution engine 180 has cached values in a cache of query execution engine 180, query execution engine 180 may retrieve the values from the cache to satisfy the relevant requests.

Query execution engine 180 may generate Query_4. Query_4 may correspond to Request_4. Query execution engine 180 may determine that no redundancy exists between Request_4 and any other pending requests of pending request agent 190. Therefore, Query_4 may include executable instructions for host 142*a* to retrieve the values of fields G, H, and I. Additionally, since there are no other requests requesting values of fields G, H, and I, in some examples, values of fields G, H, and I may not be cached.

As depicted in FIG. 3 and described above, in some examples, requests may be reordered in order to exploit redundancies and in order to cache the most relevant data. As described, requests may be reordered to maximize redundancy of cached values relative to pending requests for those values and/or may be reordered based on timestamps.

In various examples, query execution engine 180 may store a time to live (TTL) value in a cache of query execution engine 180 and/or cache 302 in association with a stored cache value, such that the relevant cache may be updated with the most relevant recent values and so that older values that are no longer needed to satisfy pending requests are not occupying the cache. As depicted in FIG. 3, in various examples, query execution engine 180 may reorder the order of the requests for data directed to host 142*a* in order to maximize redundancy among the requested and cached values.

Figure 4A:
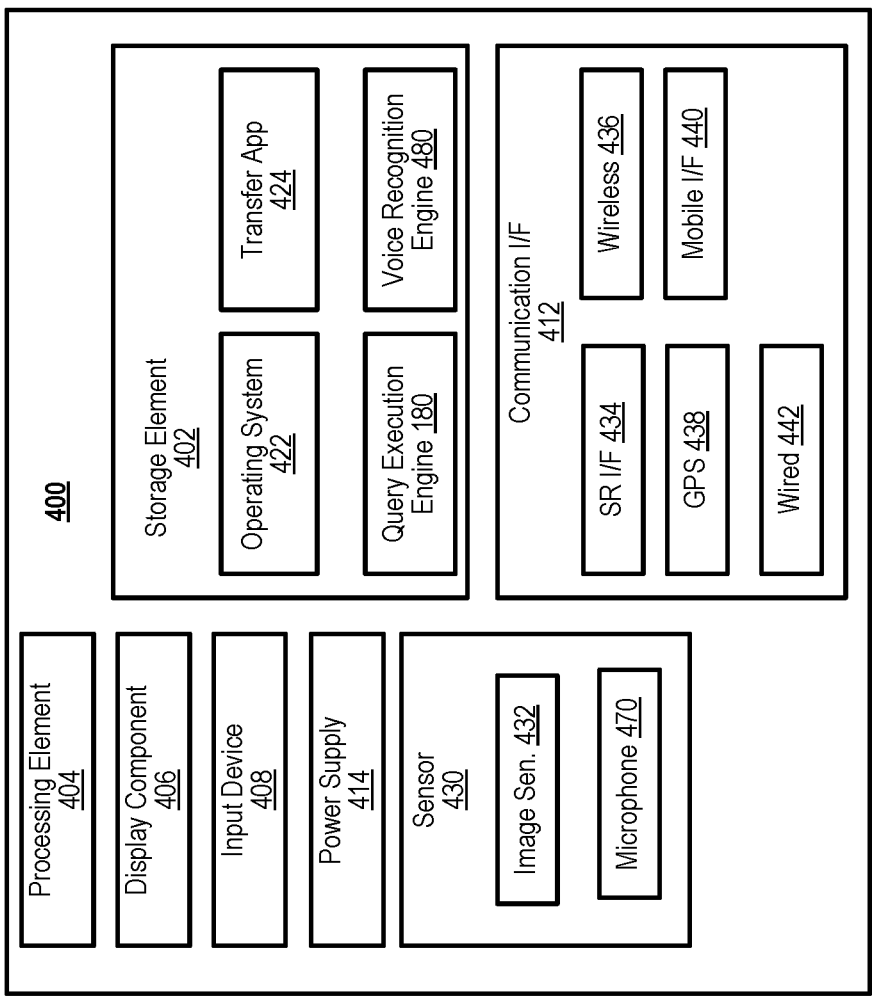
FIGS. 4A-4B are conceptual diagrams depicting computing devices that may be used in accordance with various aspects of the present disclosure.

FIG. 4A is a block diagram showing an example architecture 400 of a computing device, such as device 110, in accordance with various aspects of the presente disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). The storage element 402 can include one or more different types of memory, data storage, or non-transitory computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice commands to one or more voice recognition servers (e.g., speech processing system 120).

In some examples, storage element 402 may include a query execution engine 180. As previously described, query execution engine 180 may determine redundancy in incoming requests for contextual data and may determine appropriate executable commands to provide to one or more underlying contextual data systems (e.g., hosts 142*a*, 142*b*, . . . , 142*n* of FIG. 1) to maximize the redundancy and to execute requests in an order that is likely to reduce the number of processor cycles needed by hosts to provide the requested data. Additionally, query execution engine 180 may route all requests related to the same entity (e.g., the entity defined by the current partition key) to the same host allowing the redundancy among requests to be maximized to further improve computing efficiency.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice commands. Voice recognition engine 480 may interpret audio signals of sound captured by microphone 470. In some examples, voice recognition engine 480 may listen for a "wake-word" to be received by microphone 470. Upon receipt of the wake-word, voice recognition engine 480 may stream audio to a voice recognition server for analysis, as described above in reference to FIG. 2. In various examples, voice recognition engine 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as the network 104, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4A. Some examples of the architecture 400 may include multiple image sensors 432. For example, a panoramic camera system may comprise multiple image sensors 432 resulting in multiple images and/or video frames that may be stitched and may be blended to form a seamless panoramic output. An example of an image sensor 432 may be a camera configured to capture color information, image geometry information, and/or ambient light information.

Figure 4B:
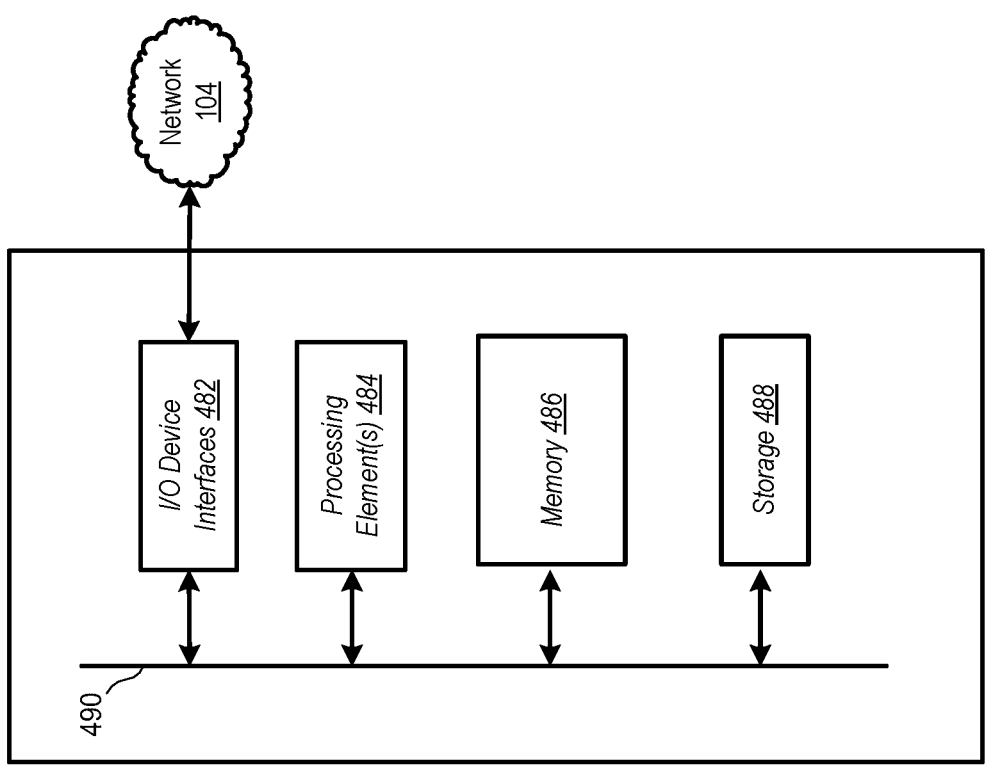

FIG. 4B is a block diagram conceptually illustrating example components of a remote device, such as the computing device(s) of speech processing system 120, which may assist with ASR processing, NLU processing, and/or command processing. Multiple computing device(s) may be included in speech processing system 120, such as one computing device for performing ASR processing, one computing device for performing NLU processing, one or more computing device of hosts 142, etc. In operation, each of these devices (or groups of devices) may include computer-readable and computer-executable instructions that reside on the respective device (110/120), as will be discussed further below.

Each of these devices (110/120) may include one or more controllers/processors 484, which may each include at least one central processing unit (CPU) for processing data and computer-readable instructions, and a memory 486 for storing data and instructions of the respective device. The memories 486 may individually include volatile random access memory (RAM), non-volatile read only memory (ROM), non-volatile magnetoresistive memory (MRAM), and/or other types of memory. Each computing device may also include a data storage component 488 for storing data and controller/processor-executable instructions. Each data storage component 488 may individually include one or more non-volatile storage types such as magnetic storage, optical storage, solid-state storage, etc. Each computing device may also be connected to removable or external non-volatile memory and/or storage (such as a removable memory card, memory key drive, networked storage, etc.) through respective input/output device interfaces 482. In various examples, one or more caches used to store redundant contextual query data may be stored in a cache of memory 486.

Computer instructions for operating each computing device and its various components may be executed by the respective device's processing element(s) 484, using the memory 486 as temporary "working" storage at runtime. A device's computer instructions may be stored in a non-transitory manner in non-volatile memory 486, storage 488, or an external device(s). Alternatively, some or all of the executable instructions may be embedded in hardware or firmware on the respective device in addition to or instead of software.

Each computing device includes input/output device interfaces 482. A variety of components may be connected through the input/output device interfaces 482, as will be discussed further below. Additionally, each computing device may include an address/data bus 490 for conveying data among components of the respective device. Each component within a computing device may also be directly connected to other components in addition to (or instead of) being connected to other components across the bus 490.

As noted above, multiple devices may be employed in a single system. In such a multi-device system, each of the devices may include different components for performing different aspects of the system's processing. The multiple devices may include overlapping components. The components of the device 110 and the speech processing system 120, as described herein, are exemplary, and may be located as a stand-alone device or may be included, in whole or in part, as a component of a larger device or system.

Figure 5:
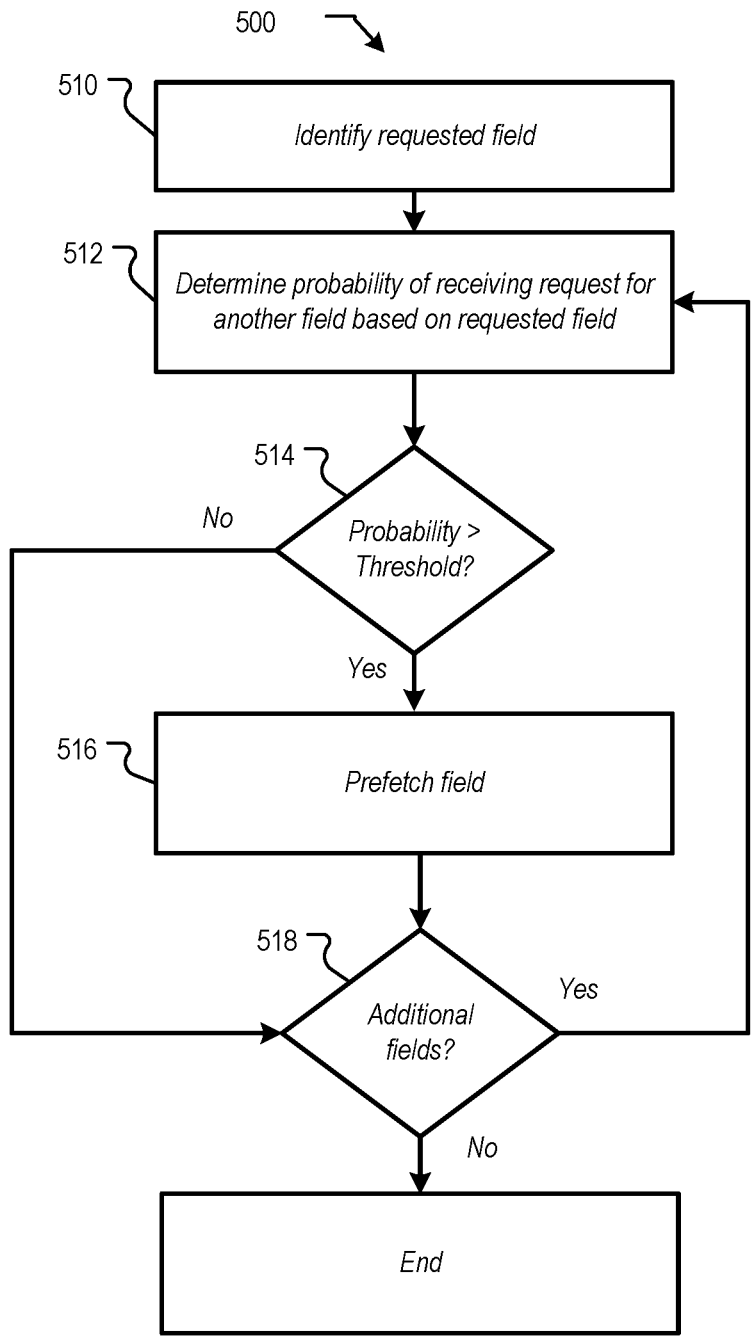
FIG. 5 depicts a flow chart showing an example process for prefetching contextual data for speech processing, in accordance with various aspects of the present disclosure.

FIG. 5 depicts a flow chart showing an example process 500 for prefetching contextual data for speech processing, in accordance with various aspects of the present disclosure.

The actions of the process 500 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure. In various examples, query execution engine 180 may perform one or more of the actions of process 500. In various other examples, one or more processors of one or more of the hosts 142a, 142b, ..., 142n may perform the various actions of process 500. In some examples, some combination of the query execution engine 180 and/or the processors of one or more of the hosts 142a, 142b, ..., 142n may perform the various actions of process 500.

In various examples, process 500 may begin at action 510, "Identify requested field". At action 510 a requested field may be identified. In an example, a query that requests the value of field A in a database may be requested.

Processing may continue from action 510 to action 512, "Determine probability of receiving request for another field based on requested field". At action 512, a probability of receiving a request for another field may be determined based on the currently requested field. In various examples, query execution engine 180, one or more of hosts 142a, 142b, ..., 142n, and/or another component of context aggregator system 138 may determine a probability based on past requests. In various examples, data related to queries of databases of a particular host may be tracked. A machine learning model may be trained to provide the probability that a particular field will be requested given a currently requested field.

At action 514, a determination may be made whether the probability that the request for the field determined at action 512 is greater than a threshold probability. If so, processing may proceed to action 516 at which the value of the field for which the probability was determined at action 512 may be prefetched and cached in a memory. The value of the field may be described as being "prefetched" since no request for the field has yet been received. If the probability is less than or equal to the threshold, a determination may be made at action 518 whether or not there are additional fields that may be prefetched based on the currently requested field. If so, processing may return to action 512 at which the probabilities of receiving requests for these additional fields may be determined based on the currently requested field. If a determination is made at action 518 that there are no additional fields the process 500 may end.

Advantageously, prefetching fields based on the statistical likelihood that a request for the fields will be received given the currently requested field may allow for reduced latency and computational burden on hosts 142a, 142b, ... 142n.

Figure 6:
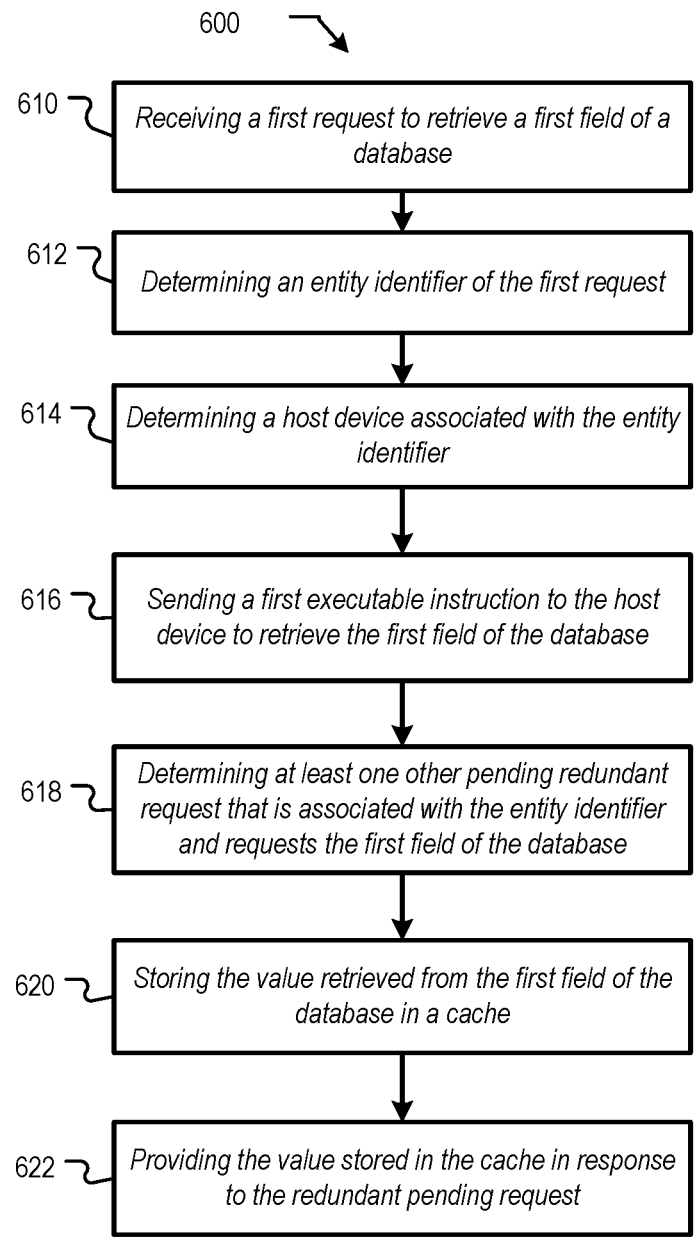
FIG. 6 depicts a flow chart showing an example process for providing shared execution caching of contextual data for speech processing, in accordance with various aspects of the present disclosure.

FIG. 6 depicts a flow chart showing an example process 600 for providing shared execution caching of contextual data for speech processing, in accordance with various aspects of the present disclosure. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, "Receiving a first request to retrieve a first field of a database". At action 610, a first request to retrieve a first field of a database may be received. In various examples, the first request may be received by context system access layer 140 of context aggregator system 138.

Process 600 may continue from action 610 to action 612, "Determining an entity identifier of the first request". At action 612, an entity identifier of the first request (e.g., entity identifier data) may be received. In various examples, the entity identifier may identify an entity and may be defined by a partition key. Examples of entities may include request identifier data, device identifier data (e.g., an identifier of a speech-enabled device such as device 110 of FIG. 1), account identifier data, user identifier data, an IP address, etc.

Process 600 may continue from action 612 to action 614, "Determining a host device associated with the entity identifier". At action 614, query execution engine 180 may determine a host device that has been designated to handle requests from the entity identifier determined at action 612. In various examples, all requests and/or queries related to a particular entity identifier may be directed to the same host device. Additionally, in various examples, a single host device may service contextual information for one or more entity identifiers.

Process 600 may continue from action 614 to action 616, "Sending a first executable instruction to the host device to retrieve the first field of the database". At action 616, query execution engine 180 may generate a first process (e.g., a first executable instruction) to retrieve the first field of the database per the request received at action 610. In various examples, the host device may call an external system using an asynchronous process or thread. Accordingly, in various examples where the request is a request to fetch data that is redundant with another pending request for the same host device, the results of the data retrieval may be cached and provided to any pending redundant requests, avoiding the need to spawn multiple new processes to fetch identical data for different requests.

Process 600 may continue from action 616 to action 618, "Determining at least one other pending redundant request that is associated with the entity identifier and requests the first field of the database". At action 618, query execution engine 180 may consult pending request agent 190 and may determine other redundant and/or partially redundant requests associated with the same entity identifier as the request received at action 610. In an example, a redundant request may be a request that requests identical data from an underlying contextual data store and/or database. For example, two requests may have identical request IDs, and may both request values from the same set of fields. In another example, a partially redundant request may request values from a subset of the same fields as some other request.

For example, speech processing system 120 may receive a request for a taxi. Natural language component 259 may receive text data related to the request and may request contextual data related to a location of the device receiving the request in order to determine the list of N-best intents for the request. In the example, the location of the device may be relevant to the proper intent based on available car services and/or skills. Additionally, a ranker component may request the same contextual data related to the location of the device, to rank the most appropriate skills based on the location of the device. For example, car service A may have an increased presence in the locality of the device relative to a car service B. As such, the ranker component may use the contextual data to rank the skill for car service A higher than the skill for car service B for processing the taxi request. The two requests for contextual data from the ranker component and the natural language component may be stored in a pending request agent 190. Query execution engine 180 may determine that both requests are requesting retrieval of the same field of a database (e.g., the field storing the location information of the device). Accordingly, at action 618, query execution engine 180 may determine that the requests are redundant and may generate a single executable instruction effective to cause the relevant contextual data host to retrieve the requested contextual data from the field.

Process 600 may continue from action 618 to action 620, "Storing the value retrieved from the first field of the database in a cache." At action 620, the value retrieved from the first field in response to the first executable instruction sent at action 616 may be stored in a cache of the context aggregator system 138 and/or of the relevant host device.

Process 600 may continue from action 620 to action 622, "Providing the value stored in the cache in response to the redundant pending request." At action 622, the value stored in the cache may be provided to any pending requests that requested the same value and/or values retrieved in response to the first executable instruction sent at action 616. Accordingly, new processes (e.g., new executable instructions) need not be created to service the redundant requests. To continue the example above, the cached result may be provided in response to the pending contextual data request from the natural language component and/or the pending contextual data request from the skill ranker component.

Among other potential benefits, a system in accordance with the present disclosure may reduce the computational burden on contextual data aggregation systems by routing requests for contextual data that are related to the same entity to the same contextual data host. Additionally, query execution engines may be used to analyze pending requests to identify redundancy. Contextual data hosts may exploit the redundancy by caching results and delaying execution of redundant and/or partially redundant queries until results of prior queries have been cached. Additionally, contextual data may be prefetched and cached based on statistical probabilities that a particular field will be fetched given a current or prior request for a different field. The techniques described herein may reduce memory requirements, reduce processor cycles, and additionally conserve power relative to current systems of contextual data aggregation for speech processing.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic, application, or skill described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic, skill, or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of retrieving contextual data for speech-processing, the method comprising:
receiving, by a context aggregator system from a natural language understanding (NLU) component of a speech processing component of a speech processing system, a first request for a first value of a first field of a database, wherein the first request includes first request identifier data identifying a natural language request received by the speech processing system, and wherein the context aggregator system stores data contextualized to an entity;
receiving, by the context aggregator system from a speech processing skill of the speech processing system, a second request for the first value of the first field, wherein the second request includes the first request identifier data;
sending the first request and the second request to a first contextual data system host of the context aggregator system, wherein the first contextual data system host is associated with the first request identifier data;
generating, by the first contextual data system host of the context aggregator system, a first executable instruction effective to retrieve the first value of the first field when executed by at least one processor of the first contextual data system host;
retrieving the first value of the first field by executing the first executable instruction;
storing the first value of the first field in a cache of the context aggregator system;
sending, by the context aggregator system to the NLU component of the speech processing system, the first value of the first field;
generating, by the NLU component, intent data based at least in part on the first value;
retrieving the first value of the first field from the cache;
sending, by the context aggregator system to the speech processing skill of the speech processing system, the first value of the first field; and
performing an action by the speech processing skill based at least in part on the intent data and the first value of the first field.

2. The computer-implemented method of claim 1, further comprising:
receiving, by the context aggregator system from the NLU component of the speech processing system, a third request for a second value of a second field of the database, wherein the third request includes second request identifier data identifying a second natural language request received by the speech processing system;
determining, by the context aggregator system, a second contextual data system host associated with the second request identifier data, wherein the first contextual data system host is different from the second contextual data system host; and
sending the third request to the second contextual data system host associated with the second request identifier data.

3. The computer-implemented method of claim 1, further comprising:
determining, by the context aggregator system, a first probability that a second value of a second field will be requested, based on first historical data indicating that both the first value and the second value were requested within a predetermined amount of time;
determining that the first probability is less than a prefetch probability threshold;
determining a second probability that a third value of a third field will be requested, based on second historical data indicating that both the first value the third value were requested within the predetermined amount of time;

determining that the second probability is greater than the prefetch probability threshold;

generating, by the first contextual data system host, a second executable instruction effective to retrieve the third value of the third field;

retrieving the third value of the third field by executing the second executable instruction; and storing the third value of the third field in the cache.

4. The computer-implemented method of claim 1, further comprising:

determining, by the context aggregator system, a first timestamp for the first request;

determining, by the context aggregator system, a second timestamp for the second request;

determining, by the context aggregator system, that the first timestamp indicates a time prior to the second timestamp; and processing, by the context aggregator system, the second request after storing the retrieved first value of the first field in the cache, based at least in part on the determination that the first timestamp indicates the time prior to the second timestamp.

5. A method comprising:

receiving, from a first speech processing component, a first request to retrieve a first value from a first field of a database;

determining first entity identifier data associated with the first request;

receiving, from the first speech processing component or from a second speech processing component different from the first speech processing component, a second request to retrieve the first value from the first field of the database;

determining second entity identifier data associated with the second request;

determining a first host device associated with the first entity identifier data and the second entity identifier data;

sending, to the first host device, the first request and the second request;

generating a first executable instruction effective to program at least one processor of the first host device to retrieve the first value from the first field of the database; and sending the first value from the first field of the database to the first speech processing component.

6. The method of claim 5, further comprising:

storing the first value from the first field of the database in a cache;

retrieving the first value from the cache based at least in part on the second request; and sending the first value retrieved from the cache to the second speech processing component.

7. The method of claim 5, further comprising:

determining third entity identifier data associated with a third request from a third speech processing component;

determining that the first host device is associated with the third entity identifier data;

determining that the third request requests retrieval of the first value from the first field of the database and a second value from a second field of the database;

storing the first value from the first field of the database in a cache;

retrieving, the first value from the cache based at least in part on at least one of the second request and the third request;

sending the first value retrieved from the cache to the second speech processing component and the third speech processing component;

generating a second executable instruction effective to program at least one processor of the first host device to retrieve the second value from the second field of the database; and sending the second value from the second field of the database to the third speech processing component.

8. The method of claim 5, further comprising:

storing the first value from the first field of the database in a cache; and storing a first time to live value in the cache in association with the first value.

9. The method of claim 5, further comprising:

determining a first probability of a second value of a second field being requested, based on at least one previous request for the first value of the first field and at least one previous request for the second value of the second field;

comparing the first probability to a first probability threshold;

determining a second probability that a third value of a third field being requested, based on at least one previous request for the first value of the first field and at least one previous request for the third value of the third field;

comparing the second probability to the first probability threshold;

generating a second executable instruction effective to program the at least one processor of the first host device to retrieve the third value of the third field based at least in part on the comparison of the second probability to the first probability threshold;

receiving, from the first host device, the third value of the third field; and storing the third value of the third field in a cache.

10. The method of claim 5, further comprising:

receiving, from a third speech processing component, a third request to retrieve the first value from the first field of the database;

determining third entity identifier data associated with the third request;

determining a second host device associated with the third entity identifier data; and sending the third request to the second host device.

11. The method of claim 5, further comprising:

determining a first plurality of requests for contextual speech-processing data, wherein each request of the first plurality of requests is associated with third entity identifier data;

determining a second plurality of requests for contextual speech-processing data, wherein each request of the second plurality of requests is associated with fourth entity identifier data, wherein the third entity identifier data is different from the fourth entity identifier data;

sending the first plurality of requests to a second host device associated with the third entity identifier data; and sending the second plurality of requests to a third host device associated with the fourth entity identifier data.

12. The method of claim 5, further comprising:

determining, among a first plurality of requests for contextual speech-processing data, the first plurality of requests comprising the first request and the second request, a first number of redundant requests to retrieve the first value from the first field of the database;

retrieving the first value from the first field of the database;

storing the first value from the first field of the database in a cache; and providing the first value from the cache based at least in part on the first plurality of requests for contextual speech-processing data.

13. A computing device comprising:

at least one processor; and a memory configured in communication with the at least one processor, the memory storing instructions that, when executed by the at least one processor, are effective to program the at least one processor to perform a method comprising:

receiving, from a first speech processing component, a first request to retrieve a first value from a first field of a database;

determining first entity identifier data associated with the first request;

receiving, from the first speech processing component or from a second speech processing component different from the first speech processing component, a second request to retrieve the first value from the first field of the database;

determining second entity identifier data associated with the second request;

determining a first host device associated with the first entity identifier data and the second entity identifier data;

sending, to the first host device, the first request and the second request;

generating a first executable instruction effective to program at least one processor of the first host device to retrieve the first value from the first field of the database; and sending the first value from the first field of the database to the first speech processing component.

14. The computing device of claim 13, wherein the instructions, when executed by the at least one processor, are effective to program the at least one processor to perform the method further comprising:

storing the first value from the first field of the database in a cache;

retrieving the first value from the cache based at least in part on the second request; and sending the first value retrieved from the cache to the second speech processing component.

15. The computing device of claim 13, wherein the instructions, when executed by the at least one processor, are effective to program the at least one processor to perform the method further comprising:

determining third entity identifier data associated with a third request from a third speech processing component;

determining that the first host device is associated with the third entity identifier data;

determining that the third request requests retrieval of the first value from the first field of the database and a second value from a second field of the database;

storing the first value from the first field of the database in a cache;

retrieving, the first value from the cache based at least in part on at least one of the second request and the third request;

sending the first value retrieved from the cache to the second speech processing component and the third speech processing component;

generating a second executable instruction effective to program at least one processor of the first host device to retrieve the second value from the second field of the database; and sending the second value from the second field of the database to the third speech processing component.

16. The computing device of claim 13, wherein the instructions, when executed by the at least one processor, are effective to program the at least one processor to perform the method further comprising:

storing the first value from the first field of the database in a cache; and storing a first time to live value in the cache in association with the first value.

17. The computing device of claim 13, wherein the instructions, when executed by the at least one processor, are effective to program the at least one processor to perform the method further comprising:

determining a first probability of a second value of a second field being requested, based on at least one previous request for the first value of the first field and at least one previous request for the second value of the second field;

comparing the first probability to a first probability threshold;

determining a second probability that a third value of a third field being requested, based on at least one previous request for the first value of the first field and at least one previous request for the third value of the third field;

comparing the second probability to the first probability threshold;

generating a second executable instruction effective to program the at least one processor of the first host device to retrieve the third value of the third field based at least in part on the comparison of the second probability to the first probability threshold;

receiving, from the first host device, the third value of the third field; and storing the third value of the third field in a cache.

18. The computing device of claim 13, wherein the instructions, when executed by the at least one processor, are effective to program the at least one processor to perform the method further comprising:

receiving, from a third speech processing component, a third request to retrieve the first value from the first field of the database;

determining third entity identifier data associated with the third request;

determining a second host device associated with the third entity identifier data; and sending the third request to the second host device.

19. The computing device of claim 13, wherein the instructions, when executed by the at least one processor, are effective to program the at least one processor to perform the method further comprising:

determining a first plurality of requests for contextual speech-processing data, wherein each request of the first plurality of requests is associated with third entity identifier data;

determining a second plurality of requests for contextual speech-processing data, wherein each request of the second plurality of requests is associated with fourth entity identifier data, wherein the third entity identifier data is different from the fourth entity identifier data;
sending the first plurality of requests to a second host device associated with the third entity identifier data; and
sending the second plurality of requests to a third host device associated with the fourth entity identifier data.

20. The computing device of claim 13, wherein the instructions, when executed by the at least one processor, are effective to program the at least one processor to perform the method further comprising:
determining, among a first plurality of requests for contextual speech-processing data, the first plurality of requests comprising the first request and the second request, a first number of redundant requests to retrieve the first value from the first field of the database;
retrieving the first value from the first field of the database;
storing the first value from the first field of the database in a cache; and
providing the first value from the cache based at least in part on the first plurality of requests for contextual speech-processing data.

\* \* \* \* \*